United States Patent [19]

Toshihide

[11] Patent Number: 5,520,313

[45] Date of Patent: May 28, 1996

[54] SMALL ARTICLE ACCOMMODATING UNIT FOR VEHICLE

[75] Inventor: Kimisawa Toshihide, Yokohama, Japan

[73] Assignee: Nifco Inc., Yokohama, Japan

[21] Appl. No.: 213,081

[22] Filed: Mar. 15, 1994

[30] Foreign Application Priority Data

Mar. 15, 1993 [JP] Japan ................. 5-010825 U

[51] Int. Cl.[6] .................. B60R 9/00; B60R 7/00; B60R 11/00

[52] U.S. Cl. .................. 224/539.000; 224/275; 224/280; 224/926; 296/37.12; 296/37.15; 248/311.2; 220/331

[58] Field of Search ................. 224/42.42, 273, 224/275, 296, 280, 281, 282, 279; 296/37.1, 37.12, 37.15, 37.7, 37.8, 37.9, 37.10, 37.11, 37.13, 37.14, 37.16; 248/311.2; 220/331, 332, 333

[56] References Cited

U.S. PATENT DOCUMENTS

| 4,091,958 | 5/1978 | Zemke | 220/331 |
|---|---|---|---|
| 4,848,627 | 7/1989 | Maeda et al. | 224/926 |
| 5,190,259 | 3/1993 | Okazaki | 224/42.42 |
| 5,280,848 | 1/1994 | Moore | 224/42.42 |

FOREIGN PATENT DOCUMENTS

| 60-21299 | 6/1985 | Japan . | |
| 3093641 | 4/1988 | Japan | 224/926 |
| 0109754 | 4/1990 | Japan | 224/281 |
| 9210681 | 6/1992 | Japan | 224/281 |
| 5-65687 | 8/1993 | Japan . | |

*Primary Examiner*—Henry J. Recla
*Assistant Examiner*—Timothy L. Maust
*Attorney, Agent, or Firm*—Armstrong, Westerman, Hattori, McLeland & Naughton

[57] ABSTRACT

A small article accommodating unit for a vehicle having: a hollow box having an opened top surface; a cover for opening/closing the opened top surface of the box; a cup holder movably held in the box and holding cups or the like exemplified by cups, cans and bottles in the hollow space in the box; an urging device for urging the cover in a direction in which the cover is opened; and a locking device for locking the cover in a direction, in which the cover is closed, against urging force of the urging device, the locking device being capable of suspending the locking state when the cover has been pushed inwards from the closed position, or having: a hollow box having an opened top surface; a cover rotatively supported by the box and arranged to open/close the opened top surface of the box; a locking device which locks the cover at a closed position and which is capable of suspending the locking state when the cover has been pressed inwards from the closed position; and a limiting device for limiting the maximum position of opening of the cover, wherein a holding device for holding the cover at its maximum position of opening is formed between the box and the cover.

20 Claims, 33 Drawing Sheets

5,520,313

SMALL ARTICLE ACCOMMODATING UNIT FOR VEHICLE

BACKGROUND OF THE INVENTION

1. Field of the Invention

The present invention relates to a small article accommodating unit for a vehicle, and more particularly to a small article accommodating unit for a vehicle having a cover which can be opened upwards with one touch of a finger, capable of holding beverage containers, such as cans, cartons, cups or bottles, and capable of preventing looseness of the opened cover due to vibrations or the like of the vehicle.

2. Description of the Related Art

There has been known related technology about a small article accommodating unit for a vehicle of the foregoing type, the small article accommodating unit comprising a hollow box having an opening thereto, a cover rotatively supported by the box and arranged to open or close the opened top of the box, a locking means which locks the cover at its closed position and which is capable of releasing the locking state when the cover has been pressed inwards from the closed position, and a limiting means for limiting the maximum position to which the cover can be opened (refer to, for example, Japanese Utility Model Laid-Open No. 5-65687).

However, the foregoing conventional small article accommodating unit for a vehicle encounters a problem that the cover is vibrated and loosens due to vibrations, or the like, of the vehicle in a state where the cover is opened, and, therefore, the comfortableness for a passenger in the vehicle deteriorates during the drive.

Another related technology about the small article accommodating unit for a vehicle has been known which comprises a hollow box having an open top, a cover pivotally supported by the box and arranged to open or close the top of the box, and a cup holder for holding cups, or the like, exemplified by cups, cans and bottles in the hollow space in the boxes, the box being opened by the hand at the time of use to insert the cups, or the like, to be held by the cup holder in the box (refer to, for example, Japanese Utility Model Application No. 60-21299).

However, the foregoing small article accommodating unit for a vehicle has a problem that the unit cannot easily be used because the cover must be opened by the hand whenever it is used.

SUMMARY OF THE INVENTION

Accordingly, an object of the present invention is to provide a small article accommodating unit for a vehicle capable of preventing looseness of a cover thereof. Another object of the present invention is to provide a small article accommodating unit for a vehicle having a cover that can be opened upwards with one touch of a finger by somewhat depressing the top surface of the closed cover so as to be easily used by a person in the vehicle. A further object of the present invention is to provide a small article accommodating unit for a vehicle having a cup holder which can be horizontally moved to be adaptable to the outer diameter of the cups, or the like, to be accommodated so that the allowable range for the outer diameter of the cups, or the like, is widened and the allowable range of the cups, or the like, that can be accommodated without looseness can be extended. A still further object of the present invention is to provide a small article accommodating unit for a vehicle having an arrangement that the opened cup holder can be held on the reverse side of the opened cover to avoid the opened cup holder being an obstacle. Another object of the present invention is to provide a small article accommodating unit for a vehicle additionally comprising a safety means for inhibiting suspension of the locking state realized by a locking means when an inertia force acts on the same so that the cover is not undesirably opened at the time of an automobile accident, or the like.

Accordingly, a small article accommodating unit for a vehicle according to the present invention, comprises: a hollow box having an open top; a cover for opening and closing the open top of the box; and locking means for locking the cover in a direction, in which the cover is closed, the locking means being capable of suspending the locking state when the cover has been pushed inwards from the closed position.

The small article accommodating unit for a vehicle according to the present invention comprises a cup holder movably held in the hollow portion of the box and holding cups, or the like, exemplified by cups, cans and bottles in the hollow space in the box; and urging means for urging the cover in a direction in which the cover is opened.

The small article accommodating unit for a vehicle according to the present invention has a structure that the cup holder is enabled to horizontally move in the box to be suitable to the outer diameters of the cups, or the like. The small article accommodating unit for a vehicle according to the present invention has a structure that the cup holder is held in the box coaxially with the cover and the cup holder can be held on the reverse side of the cover when in an opened state.

The small article accommodating unit for a vehicle according to the present invention has a structure wherein bearing portions of the cup holder and bearing portions of the box have engaging portions that are engage one another when the cup holder is opened by a predetermined angular degree. The small article accommodating unit for a vehicle according to the present invention comprises safety means for inhibiting suspension of locking state of the locking means if an inertia force has acted thereon. The small article accommodating unit for a vehicle according to the present invention comprises a card holder disposed on the reverse side of the cover.

The small article accommodating unit for a vehicle according to the present invention has a structure in which the urging means comprises coil springs, the coil springs are accommodated in caps formed into hollow shapes and disposed on the front and rear walls of the box, each of the caps having opened right and left sides, and two ends of the coil springs projecting outwardly over the opened right and left sides so that movements of the two ends of the coil springs in the direction of the thickness of the box are limited.

The small article accommodating unit for a vehicle according to the present invention has a structure that the box, is secured to a console box or the like, of the vehicle by clips disposed on securing projection portions disposed in the front and rear walls, each clips being composed of a front member and a rear member having a substantially V-like shapes, the rear member having a securing claw formed to face the front member, and the securing projection portion having an insertion groove with an opened lower surface into which the rear member of the clip is inserted.

The small article accommodating unit for a vehicle according to the present invention has a structure that an end portion is formed on the peripheral portion of the open top of the box, and a cushion member composed of a cylindrical head portion and a leg portion and made of material exhibiting excellent elasticity is inserted and secured in a hole portion of the end portion so that the cover is elastically brought into contact with the cushion member.

A small article accommodating unit for a vehicle according to the present invention comprises limiting means for limiting the maximum position of opening of the cover, and holding means for holding the cover at its maximum position of opening is formed between the box and the cover.

The small article accommodating unit for a vehicle according to the present invention has a structure that the holding means is composed of a tension spring for urging the cover from the closed position toward the maximum position of opening. The small article accommodating unit for a vehicle according to the present invention further comprises: a rotation shaft attached to at least one the box or the cover; and a guide groove in which the rotation shaft is vertically moved while being rotated and which is formed in at least one the box or the cover to which the rotation shaft is not attached, wherein the limiting means comprises a contact portion located in the guide groove and arranged to be brought into contact with the rotation shaft at the maximum position to which the cover can be opened, and the holding means comprises an elastic member which elastically projects toward the guide groove immediately in front of the contact portion of the guide groove, and which is retracted from the guide groove when the elastic member is pressed by the rotation shaft.

The small article accommodating unit for a vehicle according to the present invention has a structure that the holding means comprise a magnet attached to at least one of the box or the cover and a magnetic member which is attracted by the magnet at the maximum position at which the cover can be opened and which is attached to at least one of the box or the cover to which the magnet is not attached.

Therefore, according to the present invention, the closed cover can be opened by somewhat depressing the top surface of the cover. When the top surface of the cover is depressed, locking the state realized by the locking means is suspended so that the cover is opened upwards due to the urging force of the urging means. According to the present invention, the horizontal movement of the cup holder enables the allowable range of the outer diameters of the containers, such as cups, or the like, to be enlarged. That is, if the cup holder is moved outwardly in the radial direction of the cups to be inserted for example, cups or the like having relatively large diameters can be inserted. If the same is moved inwardly in the radial direction of the cups, or the like, cups or the like having small diameters can be held.

According to the present invention, the cup holder can be opened coaxially with the cover and the opened cup holder can be held on the reverse side of the opened cover. Therefore, the opened cover does not serve as an obstacle, and simple closing of the cover enables the cup holder to be closed simultaneously.

According to the present invention, even if an inertial force acts at the time of an automobile accident and therefore the cover is somewhat depressed, the safety means is operated to inhibit the suspension of the locking state realized by the locking means. Therefore, undesirable opening of the cover can be prevented and the body of a person is not injured by the opened cover while being angularly displaced.

According to the present invention, cards or the like can be held in the card holder disposed on the reverse side of the cover after the cover has been opened.

An edge portion is formed in the peripheral portion of the top of the box that can be opened and a cushion member is secured to the edge portion. Therefore, looseness can be prevented when the cover is closed.

According to the present invention, the cover can be held at its maximum position of opening by the holding means. As a result, looseness of the cover occurring due to vibrations of the vehicle, or the like, can be prevented. According to the present invention, when the cover has been pressed inwards from its closed position and, therefore, the locking state realized by the locking means has been suspended, the cover is, due to the tension of the tension springs, opened from the closed position toward the opening position. Since the cover is urged toward the maximum position of opening by the tension of the tension springs, the cover can be maintained at its maximum position of opening.

According to the present invention, the rotation shafts are moved downwards along the guide grooves when the cover is opened, and the rotation shafts engage to the elastic members projecting into the guide grooves. When the cover is further opened, the elastic members are pressed by the rotation shafts to be retracted from the guide grooves. Therefore, the rotation shafts are moved toward the contact portions over the elastic members.

Then, the rotation shafts are brought into contact with the contact portions of the guide grooves, and the cover is stopped at its maximum position of opening.

If the rotation shafts move inversely through the guide grooves, the rotation shafts are brought into contact with the elastic members so that the cover is held at its maximum position of opening.

According to the present invention, when the cover has been opened to its maximum position of opening, the magnetic members are attracted to the magnets. As a result, the cover can be held at its maximum position of opening.

According to the present invention, when the cover is opened, the opening movement is damped by a damper so that the opening speed is reduced and the cover is opened slowly.

Other and further objects, features and advantages of the invention will be appear more fully from the following description.

DESCRIPTION OF THE PREFERRED EMBODIMENT

Figure 1:
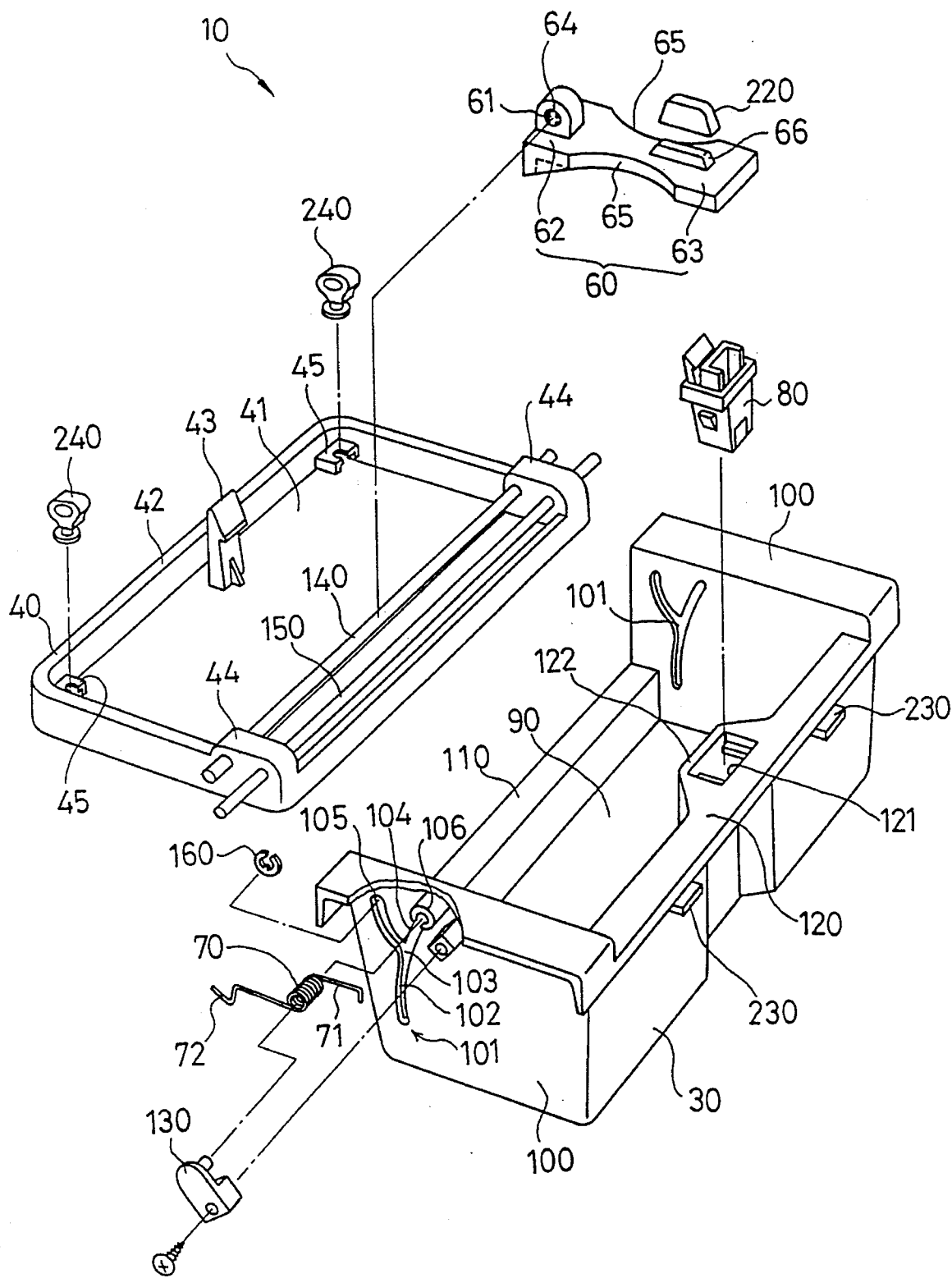
FIG. 1 is an exploded perspective view which illustrates a small article accommodating unit.
Figure 2:
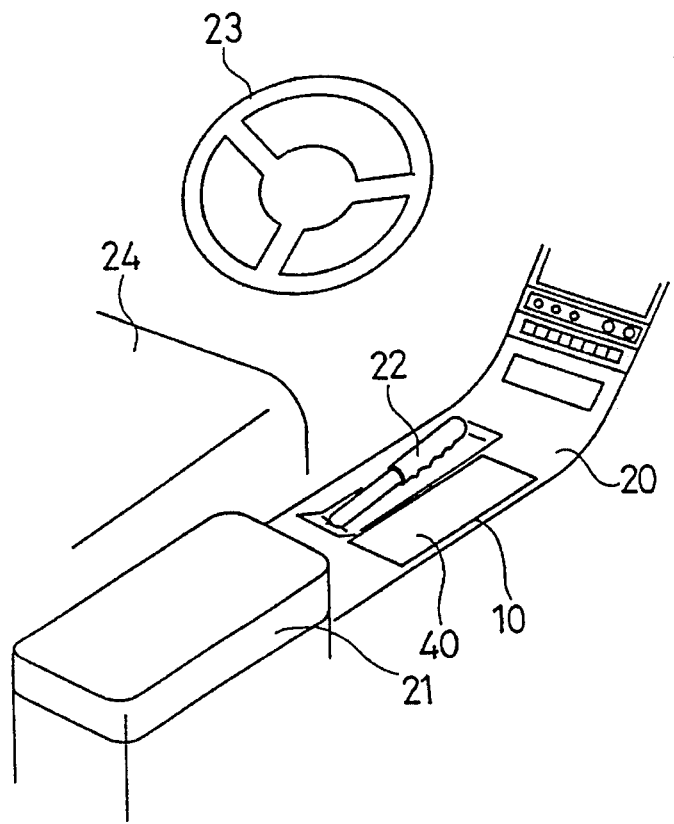
FIG. 2 is a partially schematic perspective view which illustrates the inside portion of the vehicle.
Figure 3:
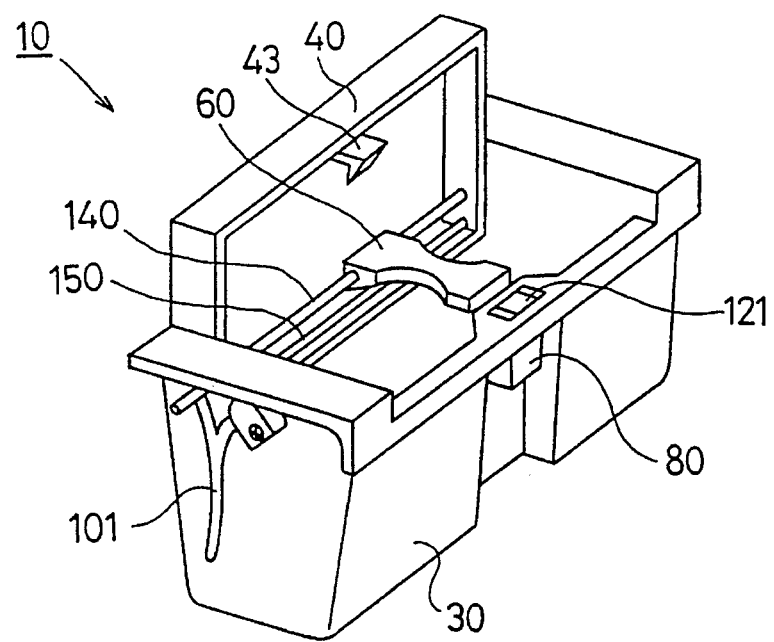
FIG. 3 is a perspective view which illustrates the small article accommodating unit.
Figure 4:
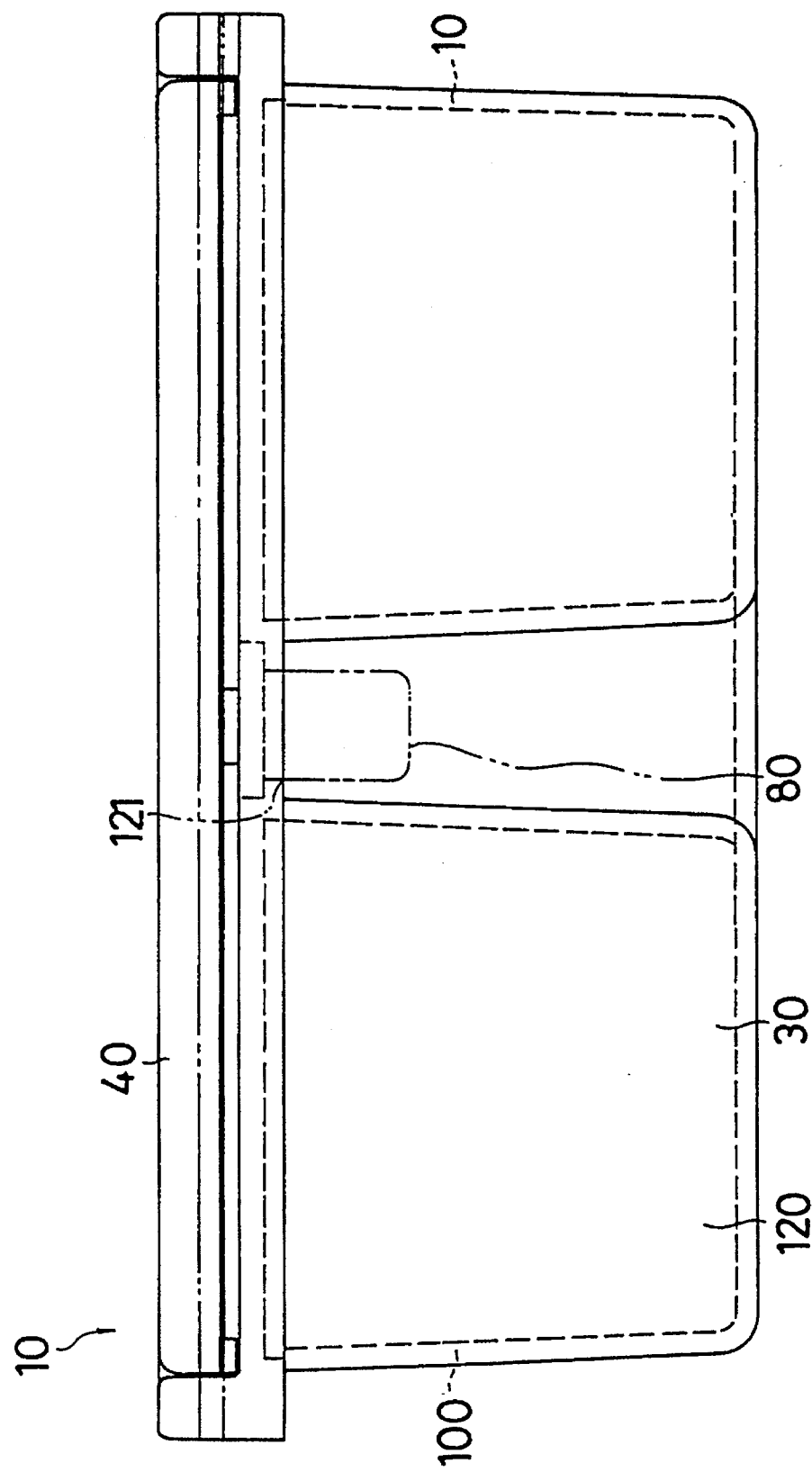
FIG. 4 is a side view which illustrates the small article accommodating unit.
Figure 5:
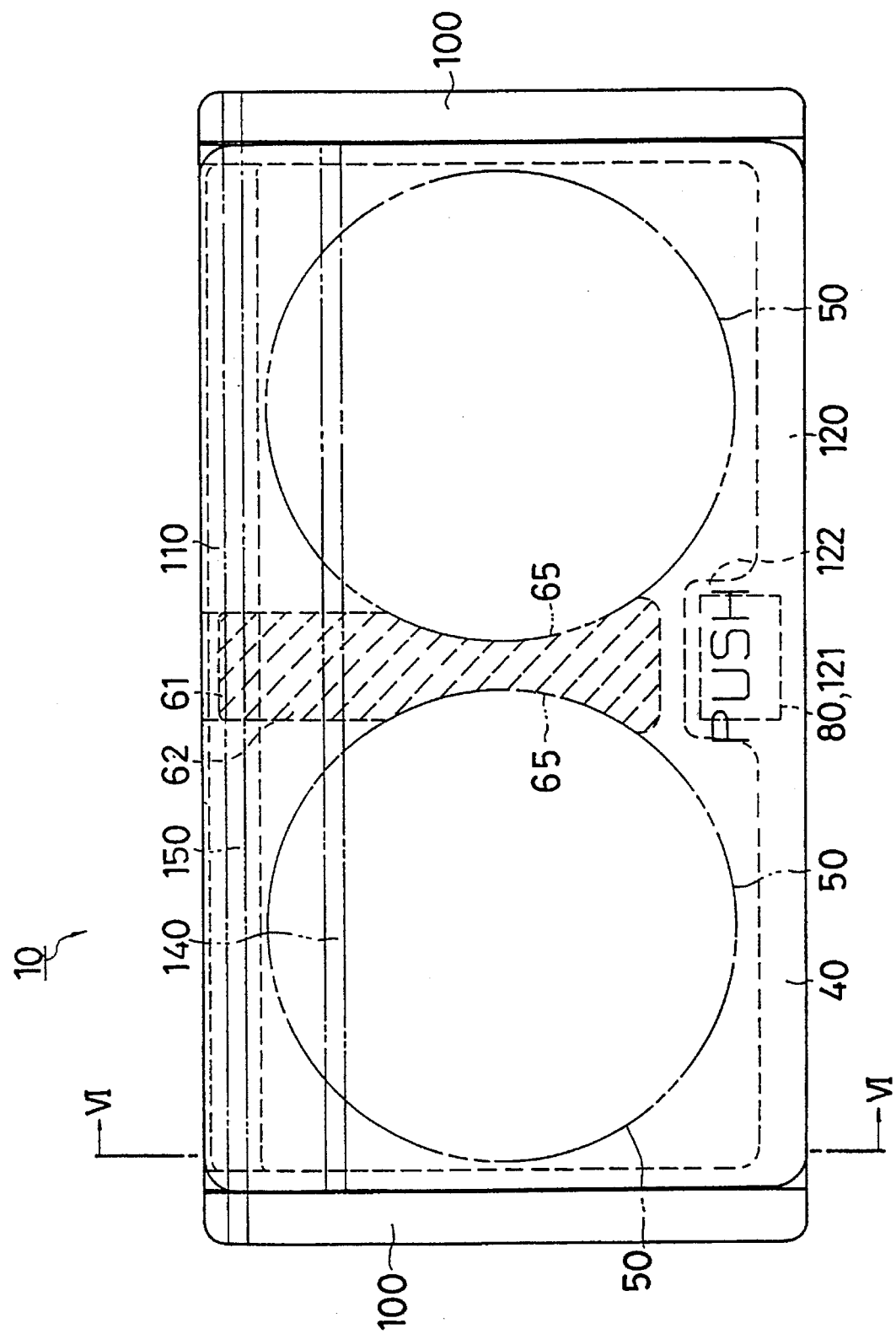
FIG. 5 is a plan view which illustrates the small article accommodating unit.
Figure 6:
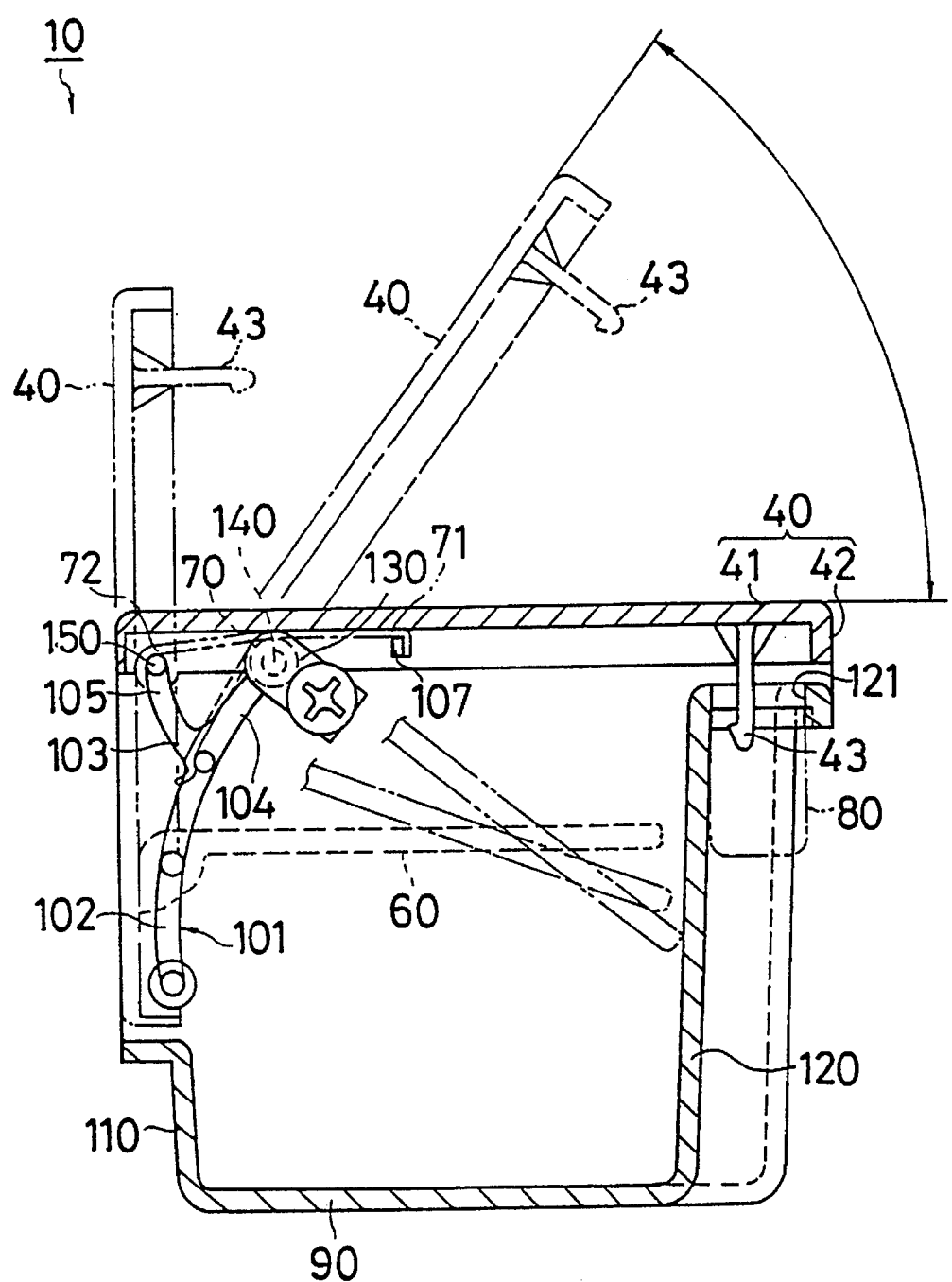
FIG. 6 is a cross sectional view taken along line VI—VI shown in FIG. 5.

FIGS. 1 to 6 illustrate a first embodiment of the present invention, wherein FIG. 1 is an exploded perspective view which illustrates a small article accommodating unit, FIG. 2 is a partial, schematic and perspective view which illustrates the inside of a vehicle to show a position at which the small article accommodating unit is attached. FIG. 3 is a perspective view which illustrates the small article accommodating unit. FIG. 4 is a side view which illustrates the small article accommodating unit. FIG. 5 is a plan view which illustrates the small article accommodating unit. FIG. 6 is cross sectional view taken along line VI—VI shown in FIG. 5.

Referring to the drawings, reference numeral 10 represents the small article accommodating unit for a vehicle, the small article accommodating unit 10 being secured to, for example, the top surface of a center console 20 in such a manner that the small article accommodating unit 10 is embedded in the same as shown in FIG. 2.

Referring to FIG. 2, reference numeral 21 represents a console box, 22 represents a side brake, 23 represents a steering wheel and 24 represents a seat. As can be understood from FIG. 2, the small article accommodating unit 10 is located adjacent to the assistant driver's seat.

The small article accommodating unit 10, as shown in FIG. 1, mainly comprises a hollow box 30 having an open top; a cover 40 for opening and closing the open top of the box 30; a cup holder 60 movably held in the box 30 and capable of holding containers, such as cups or the like 50 (see FIG. 5) including, in the category thereof, cups, cans, bottles or the like; and a urging means, for example, springs 70 for urging the cover 40 in the direction in which the cover 40 is opened and, for example, a latch unit 80 which constitutes a locking means for locking the cover 40 in a closed condition, in which the cover 40 is closed against the spring force of the springs 70; the locking means, for example the latch unit 80, being capable of suspending the foregoing locking state when the cover 40 is locked and when the cover 40 is depressed from the closed condition.

The box 30 is, as shown in FIGS. 1 and 3 to 6, formed as a hollow box having the open top, the box 30 being made of thermosetting resin, such as ABS resin exhibiting excellent rigidity by integral molding.

Specifically, the box 30 is composed of a bottom wall 90, a pair of front and rear walls 100 disposed in the front portion and the rear portion when viewed in FIG. 1 and a pair of right and left walls 120 and 110 disposed on the right and the left when viewed in FIG. 1.

The front and rear walls 100 are, as shown in FIG. 1, formed symmetrically in the longitudinal direction, the front and rear walls 100 having a height higher than that of the right and left walls 120 and 110 by the thickness of the cover 40. Therefore, the top surface of the cover 40 substantially aligns with the top surfaces of the front and rear walls 100 to form a single plane in the state where the cover 40 has been closed.

Each of the front and rear walls 100, as shown in FIGS. 1, 3 and 6, has a shaft hole 101 for holding the shaft of the cover 40 therein. Each of the shaft holes 101 is formed into a Y-like shape to penetrate the inner and outer surfaces of each of the front and rear walls 100.

Specifically, the shaft hole 101, as shown in FIG. 6, is composed of a vertical portion 102 formed into a shape elongated vertically and gently accurately inclined, a branching point 103 at which branching is realized from the top end of the vertical portion 102 to form the Y-like shape, a first branch portion 104 extending from the branching point 103 while extending at the same curvature as that of the vertical portion 102 and a second branch portion 105 extending and curving from the branching point 103.

A boss portion 106 is formed at the top end of each of the first branch portion 104, the two boss portions 106, as shown in FIG. 1, being arranged to allow the centers of the springs 70 to pass through while being formed into cylindrical shapes extending over the outer surfaces of the front and rear walls 100 in the mutually opposing directions. Further, stoppers 107 are formed on the outer surfaces of the front and rear walls 100 at the positions adjacent, with respect to the boss portions 106, to the lateral centers of the front and rear walls 100, the stoppers 107 being arranged to stop one end of the spring 70 while being formed into block shapes projecting over the front and rear walls 100 in the mutually opposing directions.

Two springs 70 are disposed in total in such a manner that their annular-shape centers are inserted into the boss portion 106 of the front and rear walls 100 and coil ends 71 are hooked by the stoppers 107. The residual coil ends of the springs 70 are formed into free ends 72 located at substantially the same positions of the branching points 103 of the shaft holes 101.

After the springs 70 have been mounted, caps 130 are attached onto the boss portions 106, and the caps 130 are fixed to the front and rear walls 100 with screws. As a result, separation of the springs 70 from the boss portion 106 is prevented.

The right and left walls 120 and 110, as shown in FIGS. 1 and 6, have different heights in such a way that the left wall 110 adjacent to the shaft holes 101 of the front and rear walls 100 is lower than the right wall 120 by a degree corresponding to the height of the shaft hole 101.

That is, the left wall 110 is, as shown in FIG. 6, designed to be somewhat lower than the lower ends of the shaft holes 101 of the front and rear walls 100 so as to enable the opened cover 40 to be moved substantially downwards as designated by an alternate long and two short dashes line shown in FIG. 6.

On the other hand, the right wall 120, as shown in FIG. 6, is higher than the left wall 110 and as well as lower than the top surfaces of the front and rear walls 100 by the thickness of the cover 40. Thus, as designated by a continuous line shown in FIG. 6, the cover is closed to form one plane with the top surfaces of the front and rear walls 100.

A mounting hole 121 is formed in the top surface of the right wall 120, the mounting hole 121 being a substantially-square through-hole formed vertically to receive the latch unit 80 as shown in FIG. 1. As shown in FIGS. 3 to 6, the latch unit 80 is inserted and fixed in the mounting hole 121.

The cover 40 is, as shown in FIGS. 1 and 6, composed of a ceiling plate 41 and a circumferential wall 42 projecting over the peripheral portion of the ceiling plate 41, the cover 40 being, similarly to the box 30, made of thermosetting resin, such as ABS resin exhibiting excellent rigidity by integral molding.

The ceiling plate 41, as shown in FIGS. 1 and 6, has a strike member 43 projecting from the inner surface of the ceiling plate 41 and received by the latch unit 80 secured to the box 30.

The circumferential wall 42, as shown in FIG. 1, has a pair of bearing portions 44 respectively projecting from the opposing ends of the circumferential wall 42 and disposed in the longitudinal direction. Two metal shafts 140 and 150 are allowed to, substantially in parallel, pass through the two bearing portions so as to be inserted into the shaft holes 101 of the box 30, the two metal shafts 140 and 150 being stopped by E-rings 160 for preventing undesirable separation.

The first shaft 140 of the two shafts 140 and 150 that is located adjacent to the strike member 43 has a relatively short length and the second shaft 150 located relatively apart from the strike member 43 has a relatively long length. The first shaft 140 is, as shown in FIG. 6, brought to the top ends of the first branch portions 104 of the shaft holes 101 in a state where the cover 40 is closed. At this time, the second shaft 150 is positioned at the top ends of the second branch portions 105 of the shaft holes 101. Moreover, the free ends 72 of the springs 70 are brought into contact with the second shaft 150 from an upper portion so that the second shaft 150 is urged downwards due to the restoring force of the springs 70.

Therefore, the cover 40 encounters a state where the second shaft 150 is moved downwards along the second branch portions 105 of the shaft holes 101 due to the restoring force of the springs 70 so that the cover 40 is opened while being turned around the first shaft 140 as designated by an alternate long and one dash line.

When the second shaft 150 has been moved to the branching points 103 of the shaft holes 101, the second shaft 150 is introduced into the vertical portion 102 from the second branch portion 105. Then, the two shafts 140 and 150 are moved along the vertical portion 102 due to the dead weight of the cover 40 so that the cover 40 is moved substantially downwards as designated by the alternate long and two dashes line shown in FIG. 6. The lowest position to which the cover 40 is moved downwards is restricted at the position at which the second shaft 150 comes in contact with the lower end of the vertical portion 102. At the lowest position, the upper half portion of the cover 40 projects over the box 30 and the lower half portion of the same is accommodated in the box 30.

As for the latch unit 80, refer to Japanese Patent Application No. 2-232560 previously filed by the applicant of the present invention. The specification and drawings attached to the foregoing application disclose a latch unit having a safety device to be mounted on a vehicle.

Figure 7:
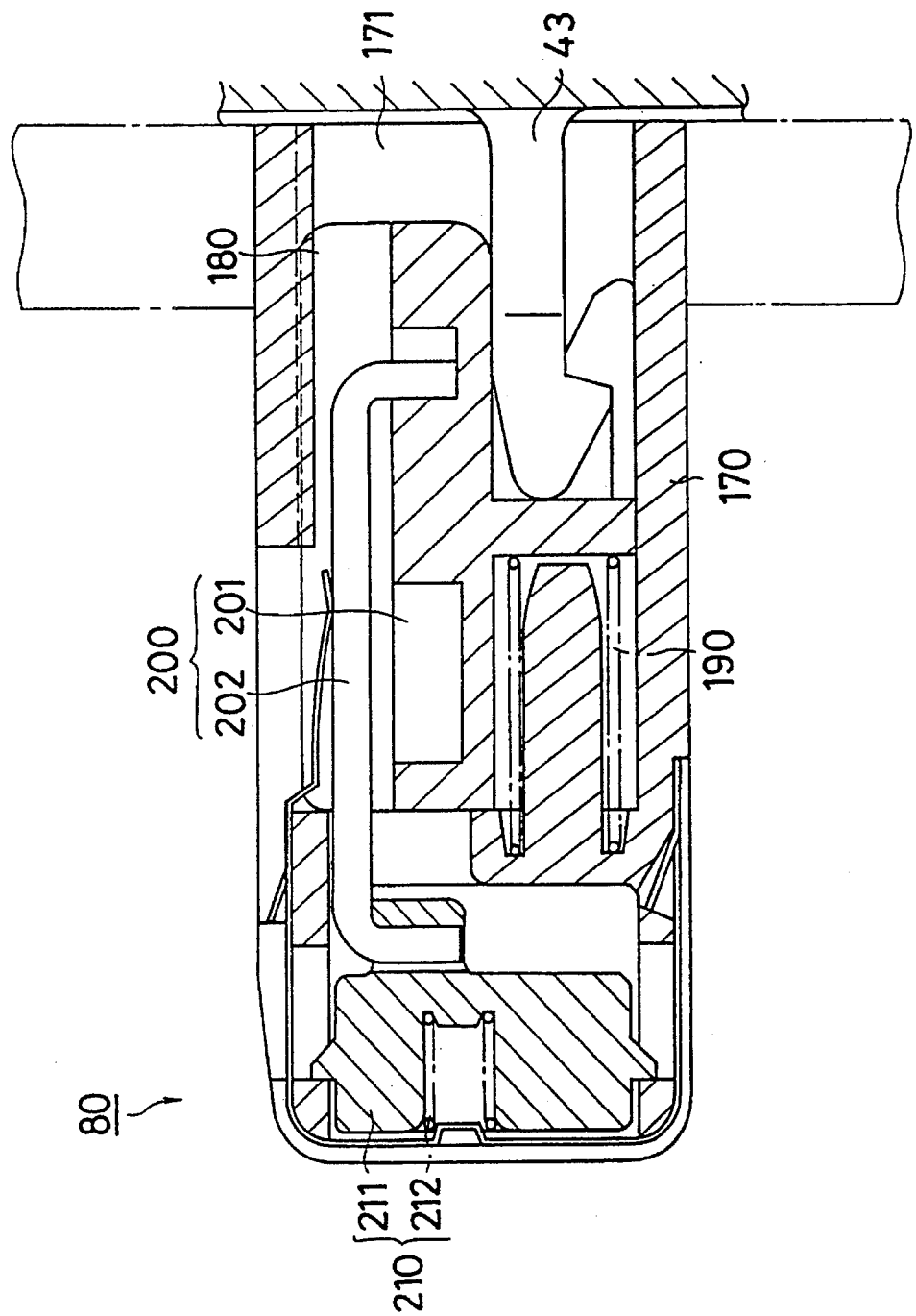
FIG. 7 is a vertical cross sectional view which illustrates an essential portion of a latch unit.
Figure 8:
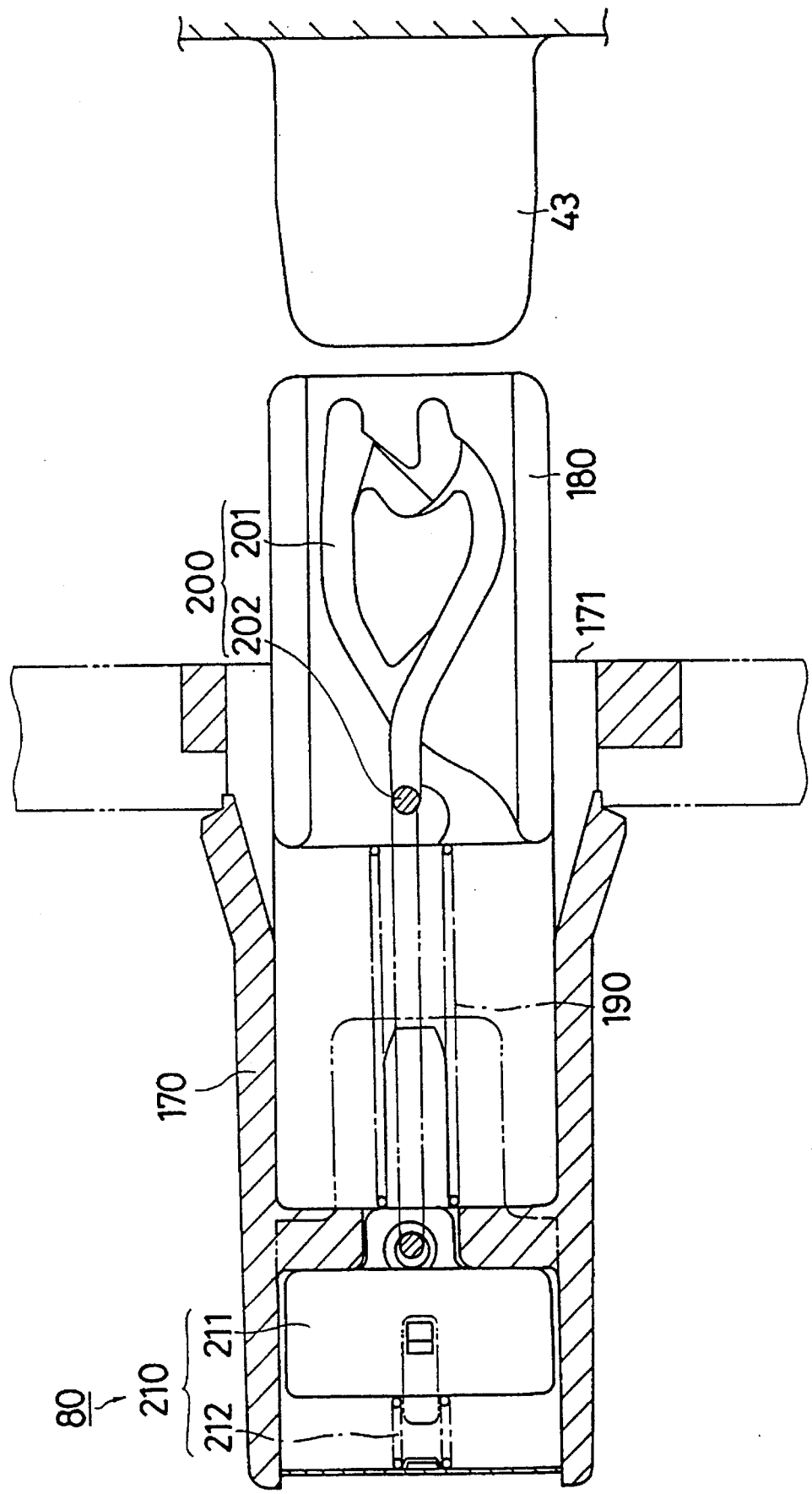
FIG. 8 is lateral cross sectional view which illustrates the latch unit.

The structure of the latch unit 80 will now be described in brief with reference to FIGS. 7 and 8. FIG. 7 is a vertical cross sectional view which illustrates an essential portion of the latch unit. FIG. 8 is a lateral cross sectional view which illustrates an essential portion of the same.

The latch unit 80, as shown in FIGS. 7 and 8, comprises a hollow case 170 having an opening portion 171, and a latch body 180 held slidably in the case 170, allowed to inserted/removed through the opening portion 171 of the case 170 and arranged to be engaged to the strike member 43 secured to the cover 40. The latch unit 80 further comprises a compression spring 190 for urging the latch body 180 in a direction in which the latch body 180 is projected over the opening portion 171 of the case 170. The latch unit 80 further comprises a locking device 200 for locking the latch body 180 at a locking position in the case 170 against the restoring force of the compression spring 190 and arranged in such a manner that the foregoing locking state is suspended when the latch body 180 has been pressed to a suspending position in the case 170 against the restoring force of the compression spring 190. In addition, the latch unit 80 comprises a safety device 210 for inhibiting the suspension of the locking state of the locking device 200 when inertia force has been applied thereto.

The locking device 200 is, as shown in FIGS. 7 and 8, composed of a cam groove 201 in the form of a heart formed in the latch body 180 and a lock lever 202 for tracing the bottom of the cam groove 201.

The safety device 210 is composed of a reacting member 211 held in the case 170 slidably in the same direction as a direction in which the latch body 180 is slid and arranged to be moved in the same direction, in which the latch body 180 is moved, when inertia force acts thereon and an urging spring 212 for urging the reacting member 211 in a direction toward the latch body 180.

Figure 9:
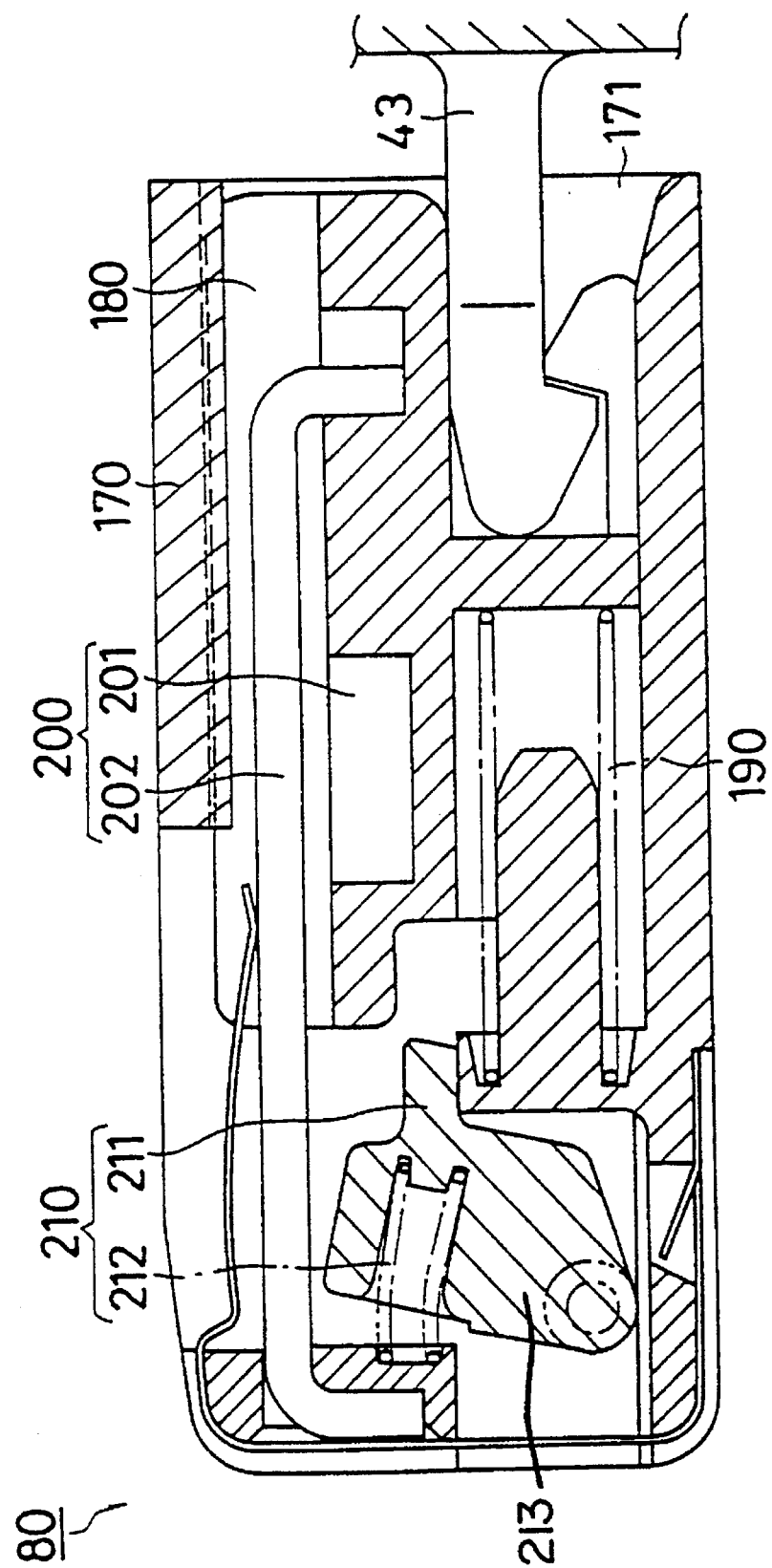
FIG. 9 is a lateral cross sectional view which illustrates an essential portion of a modification of the latch unit.

FIG. 9 is a vertical cross sectional view which illustrates an essential portion of a modification of the latch unit 80.

The latch unit 80 according to this embodiment is characterized in a safety device 210 serving as a safety means. The safety device 210 is, as shown in FIG. 9, composed of a reacting member 213 pivotally held in the case 170 to be rotated in a direction in which the reacting member 213 approaches and moves apart from the latch body 180 and brought into contact with the latch body 180 when inertia force is effected thereto so as to inhibit the movement of the latch body 180 from the locking position to the suspending position, and an urging spring 212 for urging the reacting member 213 in a direction in which the reacting member 213 is moved apart from the latch body 180.

The cup holder 60, as shown in FIG. 1, comprises a base portion 62 having a slide hole 61 into which the first shaft 140 of the cover 40 is inserted and an elongated plate portion 63 extending from the base portion 62, the cup holder 60 being made of thermosetting resin, such as PPO exhibiting excellent rigidity, by integral molding.

The slide hole 61, as shown in FIG. 1, has a plurality of ribs 64 on the inner surface thereof, the plural ribs 64 radially and inwardly extending toward the shaft to be inserted thereto. The ribs 64 are brought into contact with the outer surface of the first shaft 140 of the cover 40 to prevent turning of the cup holder 60.

The plate portion 63, as shown in FIG. 1, has a pair of warped recesses 65 formed on the two sides thereof, the curved recesses 65 being recessed inwardly in the direction of the width of the plate portion 63 to be brought into contact with the outer surface of the cups, or the like, 50. Further, a projecting member 66 in the form of a trapezoid is formed on the top surface of the plate portion 63. The projection member 66 is covered with a vibration isolating cover 220. The vibration isolating cover 220 is made of resin, such as EPDM or the like exhibiting excellent rigidity by integral molding. The vibration isolating cover 220 is elastically brought into contact with the inner surface of the ceiling plate 41 of the cover 40 if the cup holder 60 is undesirably turned around the first shaft 140 of the cover 40 so that noise generation is prevented.

On the other hand, a vibration isolating means having elasticity is disposed between the box 30 and the cover 40 to prevent noise generation due to vibrations caused from the contact of the closed cover 40 with the box 30.

In this embodiment, a vibration isolating sheet 230 is attached to a position of the box 30 and a vibration isolating rubber 240 is attached to a position of the cover 40.

The vibration isolating sheet 230 is made of, for example, a relatively thick unwoven fabric. Two vibration isolating sheets 230 are disposed in total in such a manner that they are secured to the right wall 120 of the box 30. More specifically they are secured in front of and in the rear of the mounting hole 121 in the box 30 to interpose the mounting hole 121 as shown in FIG. 1. The vibration isolating sheets 230 are bonded to the right wall 120 by using, for example, pressure sensitive adhesive double-coated tapes (omitted from illustration) in such a manner that a portion of each of the vibration isolating sheets 230 projects over the right wall 120. The projecting portions of the vibration isolating sheets 230 are elastically brought into the inner surface of the circumferential wall 42 of the closed cover 40.

Figure 10:
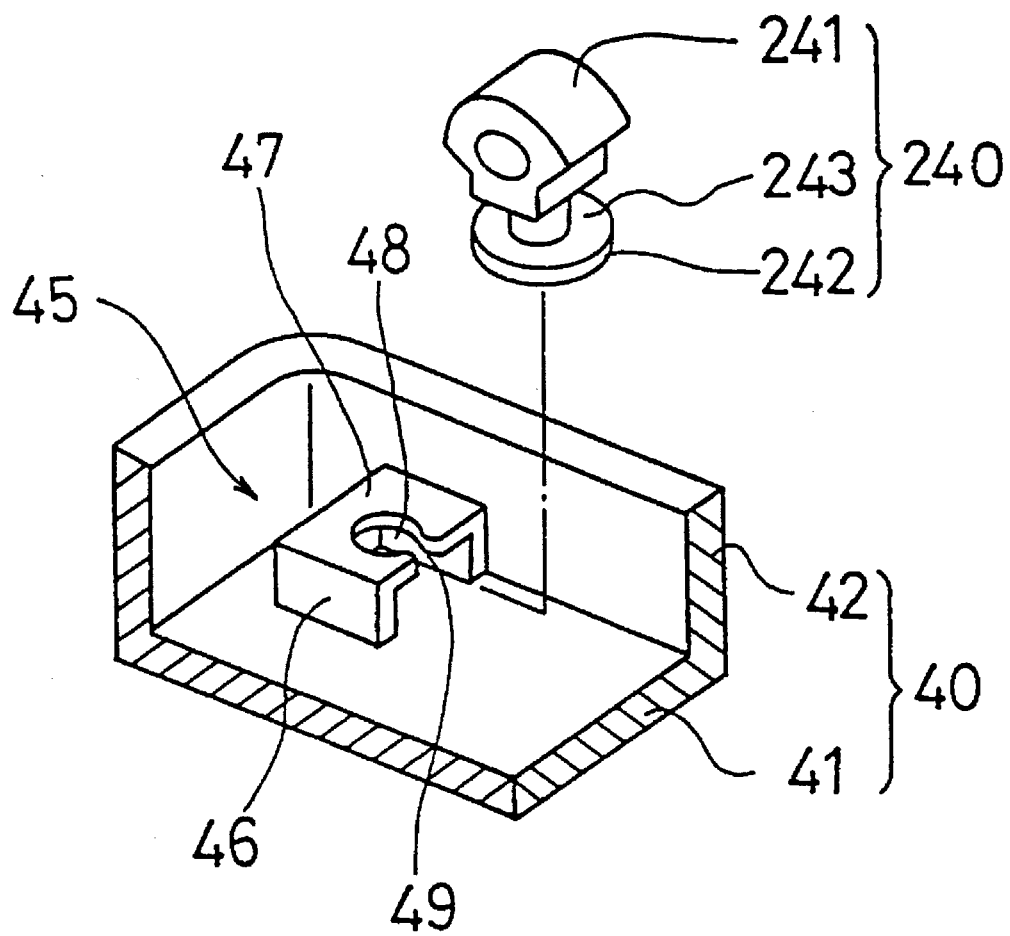
FIG. 10 is partially exploded perspective view which illustrates a vibration isolating rubber.

The vibration isolating rubber 240 is, as shown in FIG. 10, composed of a pantagraph-like head portion 241 and a leg portion 242 hanging from the head portion 241, the vibration isolating rubber 240 being made of, for example, thermosetting resin, such as EPDM exhibiting excellent elasticity by integral molding. Further, an annular groove 243 recessed inwardly in the radial direction is formed between the head portion 241 and the leg portion 242.

The vibration isolating rubber 240 is, as shown in FIG. 10, secured to the inner surface of the ceiling plate 41 of the cover 40. Specifically, two vibration isolating rubbers 240 are secured in total to interpose the strike 43 of the ceiling plate 41 therebetween. The ceiling plate 41 of the cover 40 has support frames 45 formed at each position thereof at which the vibration isolating rubber 240 is attached.

Each support frame 45 is, as shown in FIG. 1, composed of U-shape side plates 46 projecting over the inner surface of the ceiling plate 41 of the cover 40 and a support plate 47 for closing the plane between the side plates 46, the plane facing the inner surface of the ceiling plate 41.

The support plate 47 has, as shown in FIG. 10, a thickness slightly thicker than the vertical width of the annular groove 243 of the vibration insulating rubber 240. The support plate 47 has a C-shape support groove 48 formed in the straight end surface of the support plate 47. The inner diameter of the support groove 48 is designed to be somewhat smaller than the inner diameter of the annular groove 243 of the vibration insulating rubber 240. Further, the width of a narrowed portion 49 of the support groove 48 is made to be somewhat smaller than the inner diameter of the annular groove 243.

In order to attach the vibration isolating rubber 240, the vibration isolating rubber 240 is laterally inserted in such a manner that its annular groove 243 is allowed to align the end of the opened portion of the support groove 48 of the support frame 45. When the vibration isolating rubber 240 is inserted, the inner diameter of the annular groove 243 is contracted due to the elasticity of the rubber at the time of passing through the narrowed portion 49 of the support groove 48 so that the vibration isolating rubber 240 is attached. After the annular groove 243 has allowed to pass through the narrow portion 49, the narrowed groove 243 is fitted within the support groove 48 in such a manner that the annular groove 243 cannot be separated because it is expanded due to the elasticity of the rubber.

The procedure of using the small article accommodating unit 10 having the foregoing structure will now be described.

In order to open the closed cover 40, the top surface of the cover 40 is somewhat depressed as shown in FIGS. 4 to 6. When the cover 40 has been depressed, the strike 43 presses the latch unit 80 so that the locking state is suspended.

As a result, the cover 40 is, as designated by the alternative long and short dash line shown in FIG. 6, opened while being turned upwardly around the first shaft 140 because the restoring force of the spring 70 acting downwards moves the second shaft 150 along the second branch portion 105 of the shaft hole 101.

When the second shaft 150 has been moved downwards to the branching point 103 of the shaft hole 101, the second shaft 150 is introduced into the vertical portion 102 through the second branch portion 105. Then, the dead weight of the cover 40 causes the two shafts 140 and 150. to move downwards along the vertical portion 102. Therefore, the cover 40 is, as designated by the alternate long and two short dashes line shown in FIG. 6, moved substantially downwards so that its lower half portion is accommodated in the box 30 and the upper half portion of the same is upwardly projected above the box 30.

Two cups or the like, 50 can be inserted into the box 30 on the two sides of the cup holder 60 through the open top of the box 30 while being laterally disposed, as shown in FIG. 5. When the cups, or the like, 50 have been inserted, the bottoms thereof are received by the top surface of the bottom wall 90 of the box 30. As a result, the cups, or the like, 50 are held by the cup holder 60 so as not to fall in the box 30.

The outer diameter of each of the cups, or the like, 50 that can be inserted into the box 30 can be varied freely by sliding the cup holder 60 in the axial direction of the first shaft 140. That is, the outer diameter of each of the cups, or the like, 50 that can be inserted into the box 30 depends upon the distance from the inner surface of the front wall of the box 30 to the cup holder 60 when a consideration is made about the front wall of the box 30. If the cup holder 60 is caused to approach the front wall, cups, or the like, 50, each having a small diameter, can be held without looseness. If the cup holder 60 is moved away from the front wall, cups, or the like, 50 having large diameter can be inserted.

In a case where the box is used as a small article accommodating box, the cup holder 60 is slid in the axial direction of the first shaft 140 to be positioned adjacent to one of the front and rear walls 100. If the cup holder 60 is positioned adjacent to one of the front and rear walls 100, the opened front surface of the box 30 is greatly opened so that small articles (omitted from illustration) can easily be inserted or taken out.

Figure 11:
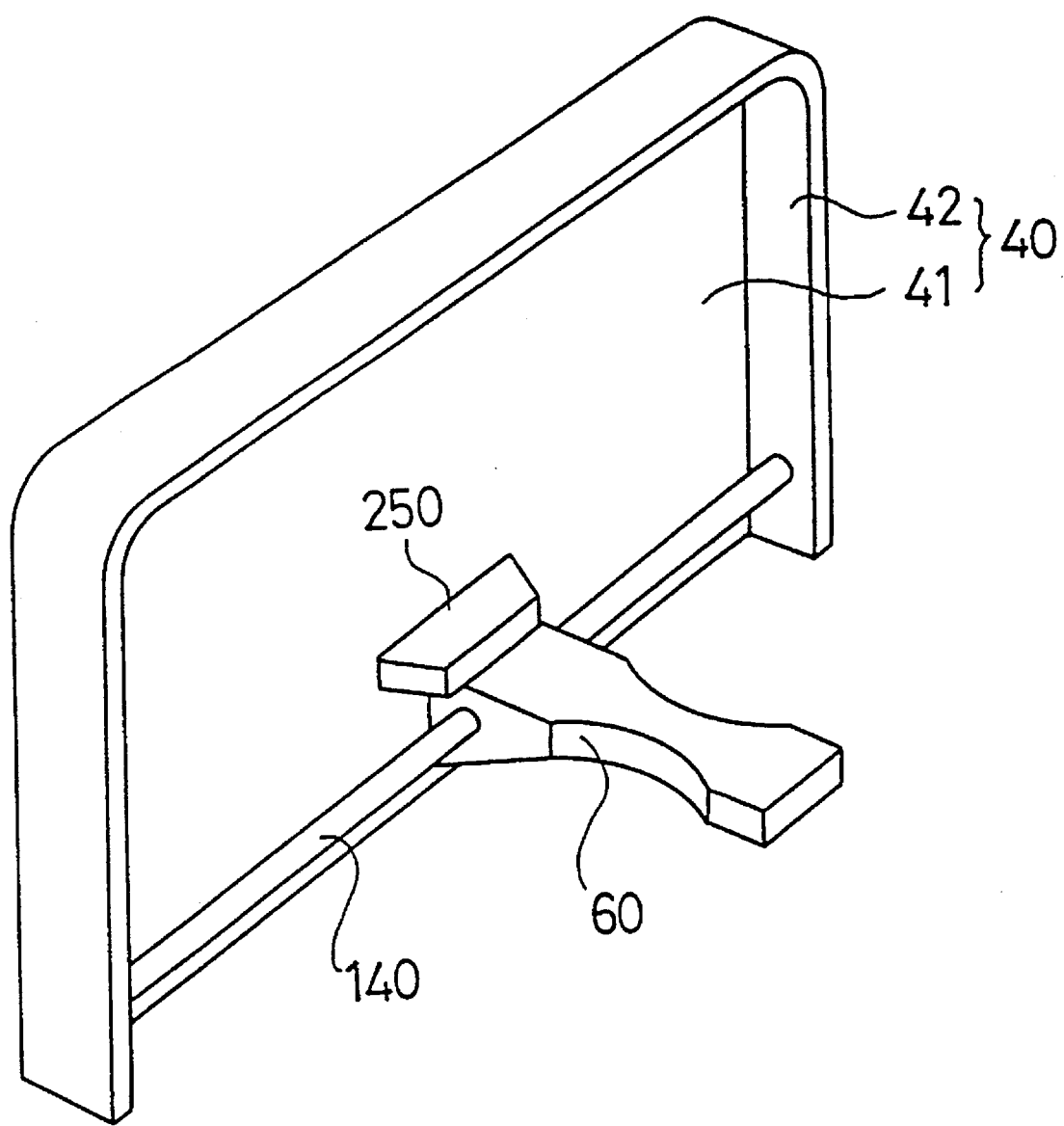
FIG. 11 is a schematic perspective view which illustrates a cover according to a second embodiment of the present invention.

FIG. 11 is a schematic perspective view which illustrates a cover 40 according to a second embodiment of the present invention.

That is, the inner surface of the ceiling plate 41 of the cover 40 has, as shown in FIG. 11, a rotation-preventing member 250 which is brought into contact with the top surface of the cup holder 60. The rotation-preventing member 250 is formed at substantially the center of the ceiling plate 41 in the longitudinal direction. The longitudinal directional width of the rotation-preventing member 250 is made to be the same as the longitudinal width of a central projection 122 (see FIG. 1) having the mounting hole 121 formed in the right wall 120, the central projection 122 being projected into the box 30.

According to this embodiment, the arrangement that the top surface of the cup holder 60 is brought into contact with the lower surface of the rotation-preventing member 250 is able to prevent the upward turn of the cup holder 60 around the first shaft 140.

The reason why the rotation-preventing member 250 is formed along the central projection 122 in the box 30 is that interference of the leading portion of the cup holder 60 with the central projection 122 due to contact, or the like, must be prevented.

The rotation-preventing member 250 may be elongated in the axial direction of the first shaft 140.

Figure 12:
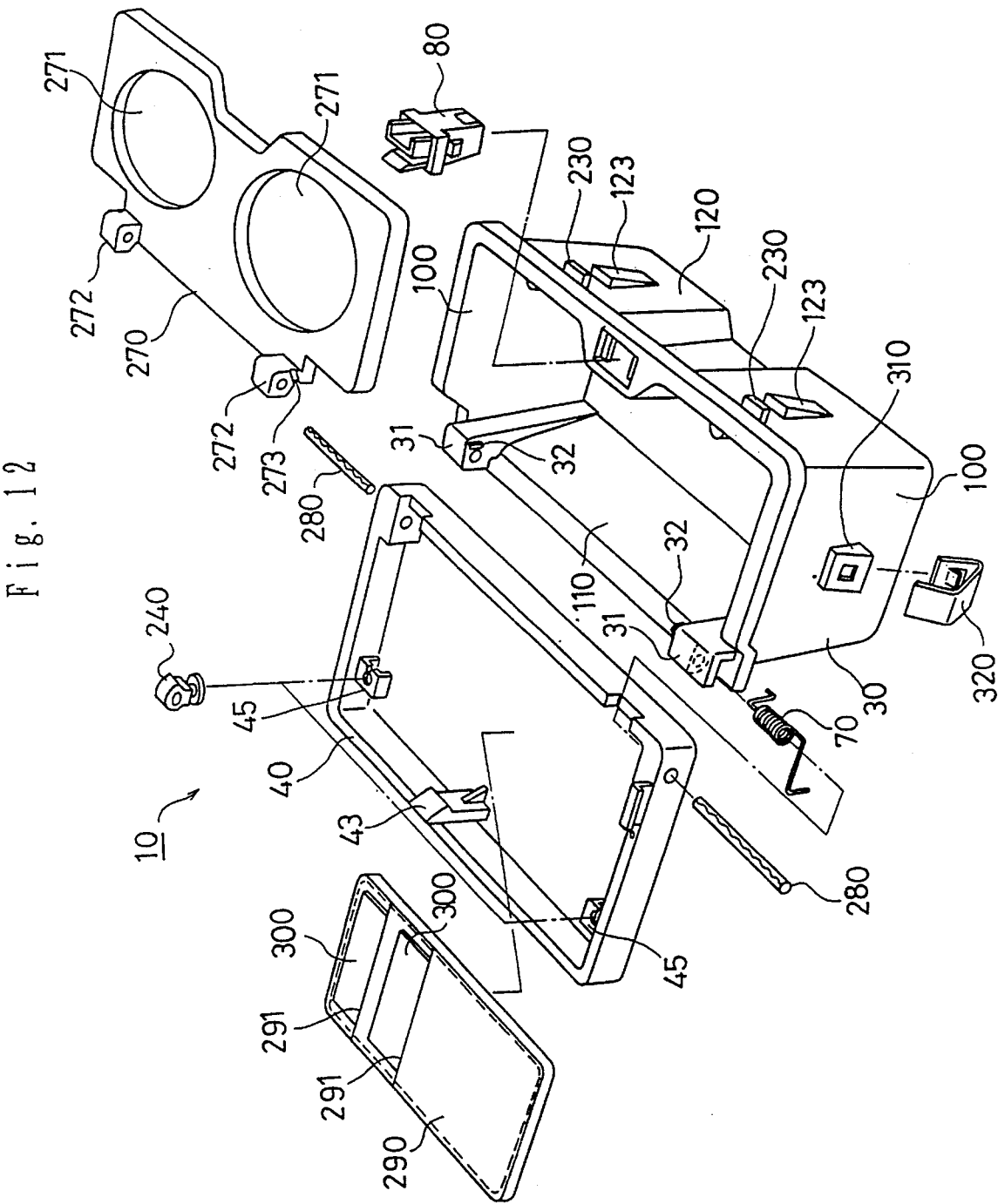
FIG. 12 is an exploded perspective view which illustrates a third embodiment of the small article accommodating unit.
Figure 13:
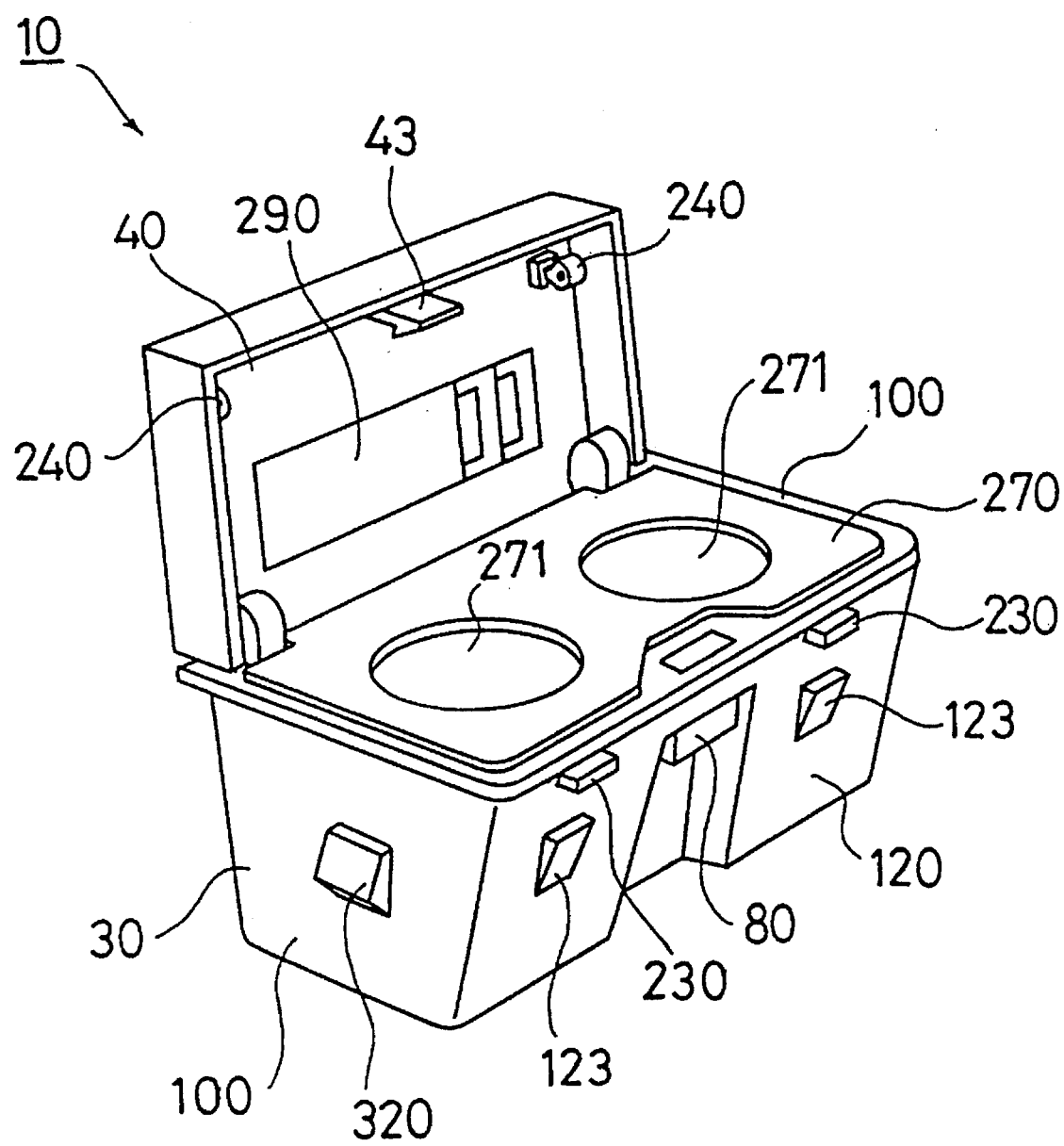
FIG. 13 is a perspective view which illustrates the small article accommodating unit according to the third embodiment of the present invention.
Figure 14:
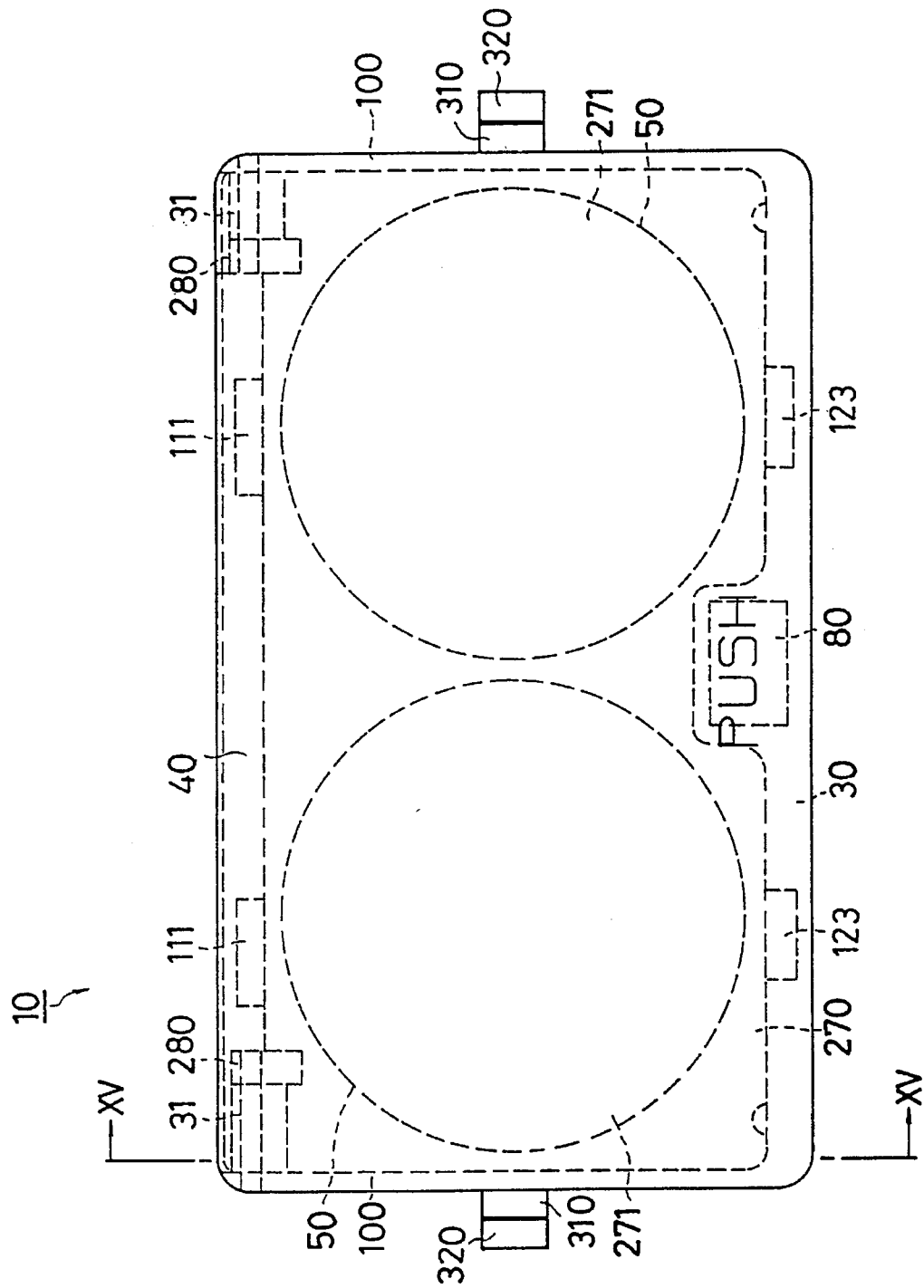
FIG. 14 is a plan view which illustrates the small article accommodating unit according to the third embodiment of the present invention.
Figure 15:
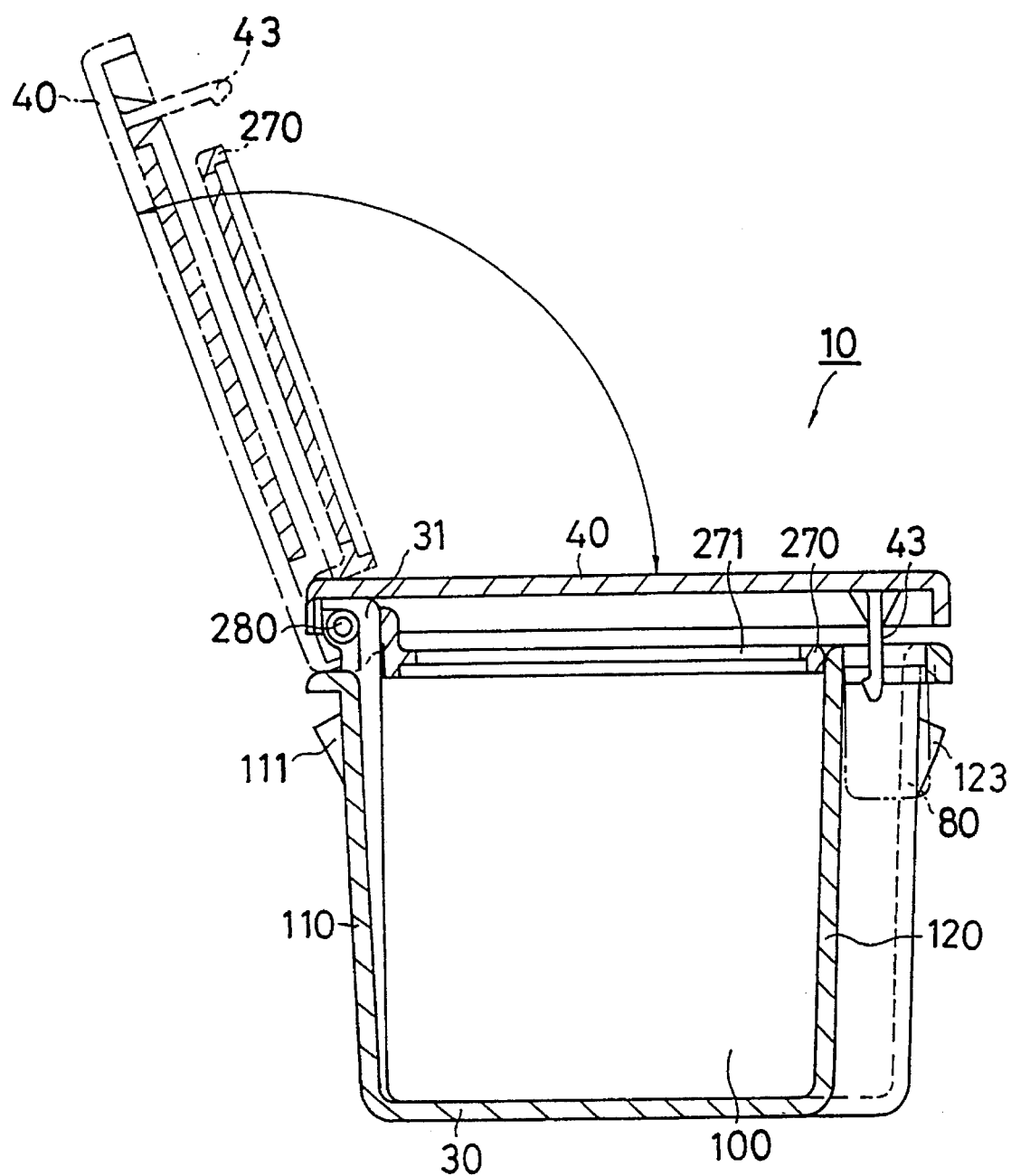
FIG. 15 is a cross sectional view taken along line XV—XV shown in FIG. 14.

FIGS. 12 to 15 illustrate a third embodiment of the small article accommodating unit. FIG. 12 is an exploded perspective view which illustrates the small article accommodating unit. FIG. 13 is a perspective view which illustrates the small article accommodating unit. FIG. 14 is a plan view which illustrates the small article accommodating unit. FIG. 15 is a cross sectional view taken along line XV—XV shown in FIG. 14.

This embodiment is characterized by a cup holder 270.

The cup holder 270, as shown in FIGS. 12 to 15, has a size which allows the cup holder 270 to be substantially fitted within the opened top surface of the box 30, the cup holder 270 having, on the two sides thereof, a pair of insertion holes 271 into which the cups, or the like, 50 can be inserted.

The cup holder 270 is, as shown in FIGS. 12 to 15, pivotally secured to the box 30 by using a pair of spring pins 280 concentrically inserted into holes in the cover 40. Projections 32 or recess portions 273 are formed between the cup holder 270 and two bearing portions 31 and 272 as designated by an alternative long and short dash line, the projection/recess portions 32 and 273 being arranged to lock the the cup holder 270 in its open state in such a manner that the cup holder 270 is opened upwardly to a position substantially the same as the maximum position to which the cover 40 can be opened, that is, in such a manner that the cup holder 270 is opened by about 110 angular degrees.

More specifically, the bearing portions 272 of the cup holder 270 have, as shown in FIG. 12, the locking recess portions 273, each of which is recessed to have a semicircular cross sectional shape. On the other hand, the mutually opposing bearing portions 31 of the box 30 have locking projection portions 32 for receiving the foregoing locking recess portions 273 and each having a semicircular cross sectional shape. The locking projection/recess portions 32 and 273 are engaged to each other at a position at which the cup holder 270 is opened by about 110 angular degrees.

Figure 16:
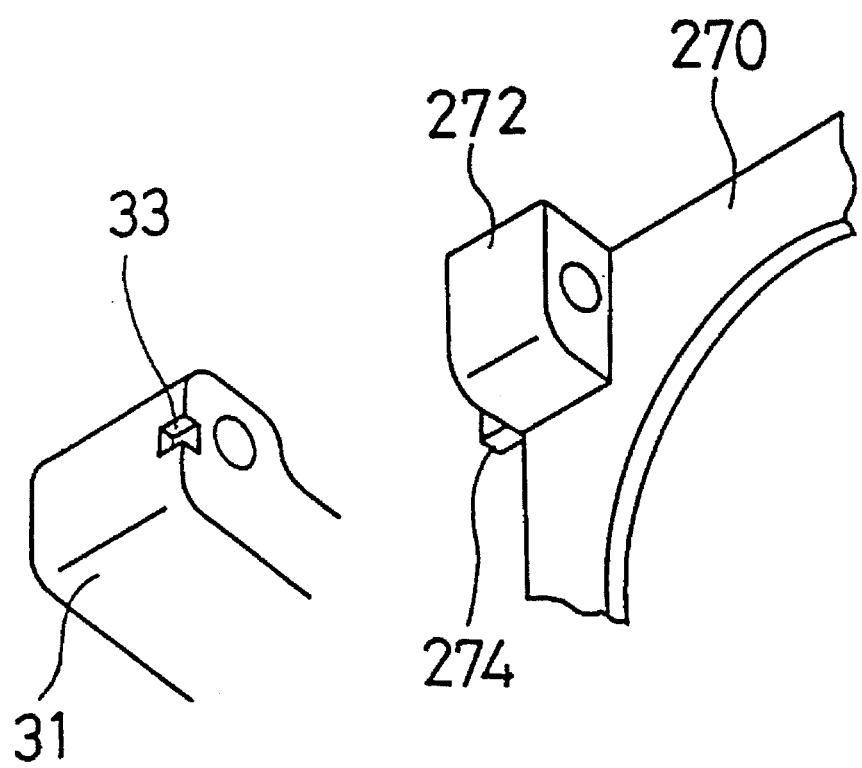
FIG. 16 is a partial perspective view which illustrates bearing portions of the box and the cup holder according to a fourth embodiment of the present invention.

As shown in FIG. 16, another structure may be employed in which locking projection portions 274 are formed in the bearing portions 272 of the cup holder 270 and cooperating locking recess portions 33 are formed in the bearing portions 31 of the box 31 to receive the projection portions 247.

As a result, according to the third embodiment, the cover 40 is opened upwards around the spring pin 280 as designated by the alternative long and short dash line shown in FIG. 15. When the cup holder 270 is similarly opened by about 110 angular degrees in the foregoing state, the two locking projections/recesses 32 and 273 are engaged to each other so that the cup holder 270 is locked in the opened state.

Since the cup holder 270 is, therefore, held on the reverse side of the opened cover 40, the opened cup holder 270 does not interrupt the easy insertion and removal of articles from the box 30. Since undesirable closing of the cup holder 270 is prevented, the apparatus can safely be used.

Since closing of the cover 40 causes the cup holder 270 to be closed simultaneously because it is pressed by the cover 40, the labor of individually closing the cup holder 270 and the cover 40 can be omitted.

When the cup holder 270 is closed, the locking recess portions 273 are removed from the locking projection portions 32 of the box 30.

Therefore, when the cover 40 is opened at the next time, the cover 40 is individually opened and the cup holder 270 is brought into a closed state. As a result, the cup holder 270 can immediately be used. Moreover, a risk of erroneously using the box as an ashtray or the like can be eliminated because the cup holder 270 is closed.

Further, a card holder 290 is, as shown in FIGS. 12 and 13, formed on the reverse side of the cover 40. The card holder 290 is formed by a bag produced by sewing a sheet made of vinyl or leather, or the like. The card holder 290 has, on the surface thereof, slits 291 forming a plurality of pouches, for example, two pouches into which cards or the like, 300, exemplified by credit cards, prepaid cards and superhighway tickets, can be inserted.

The card holder 290 is, as shown in FIGS. 12 and 13, bonded to the inner surface of a ceiling plate 301 of the cover 40 by using an adhesive agent or a pressure sensitive adhesive double-coated tape.

The card holder 290 is, as shown in FIG. 13, used after the cover 40 has been opened in such a manner that the cards or the like 300 are inserted or taken out from the pouches of the card holder 290.

Since the reverse side of the cover 40 is used, the card holder 290 does not serve as an obstacle. Because the cards, or the like, 300 can be accommodated while being arranged in order, loss of them can be prevented. In addition, noise generation due to the movement of the cards or the like, 300 in the box 30 can satisfactorily be prevented, as compared with a case in which the cards or the like, 300 are directly accommodated in the box 30.

On the other hand, the front and rear walls 100 of the box 30, as shown in FIGS. 12 to 15, have fixing projection portions 310 projecting from the two outer side surfaces of the box 30 in opposite directions, the fixing projections 310 being used to mount the box 30 on the center console 20.

Furthermore, the right and left walls 120 and 110 of the box 30, as shown in FIG. 12, have elastic claws 111 and 123 for mounting the box 30 on the center console 20.

When the box 30 is inserted into a mounting hole (omitted from illustration) in the center console 20, the elastic claws 111 and 123 of the right and left walls 120 and 110 are deformed inwards. As a result, the box 30 is inserted into the mounting hole in the center console 20. Since the elastic claws 111 and 123 are then restored on the reverse sides of the center console, the upward separation of the box 30 from the center console 20 can be prevented.

Fixing the projection portions 310 of the front and rear walls 100 of the box 30 are, as shown in FIG. 12, secured to the inside portion of the center console 20 by metal clips 320, each having a V-like cross sectional shape.

In the description of the third embodiment, the same components as those of the foregoing first embodiment are given the same reference numerals and their specific descriptions are omitted here.

Figure 17:
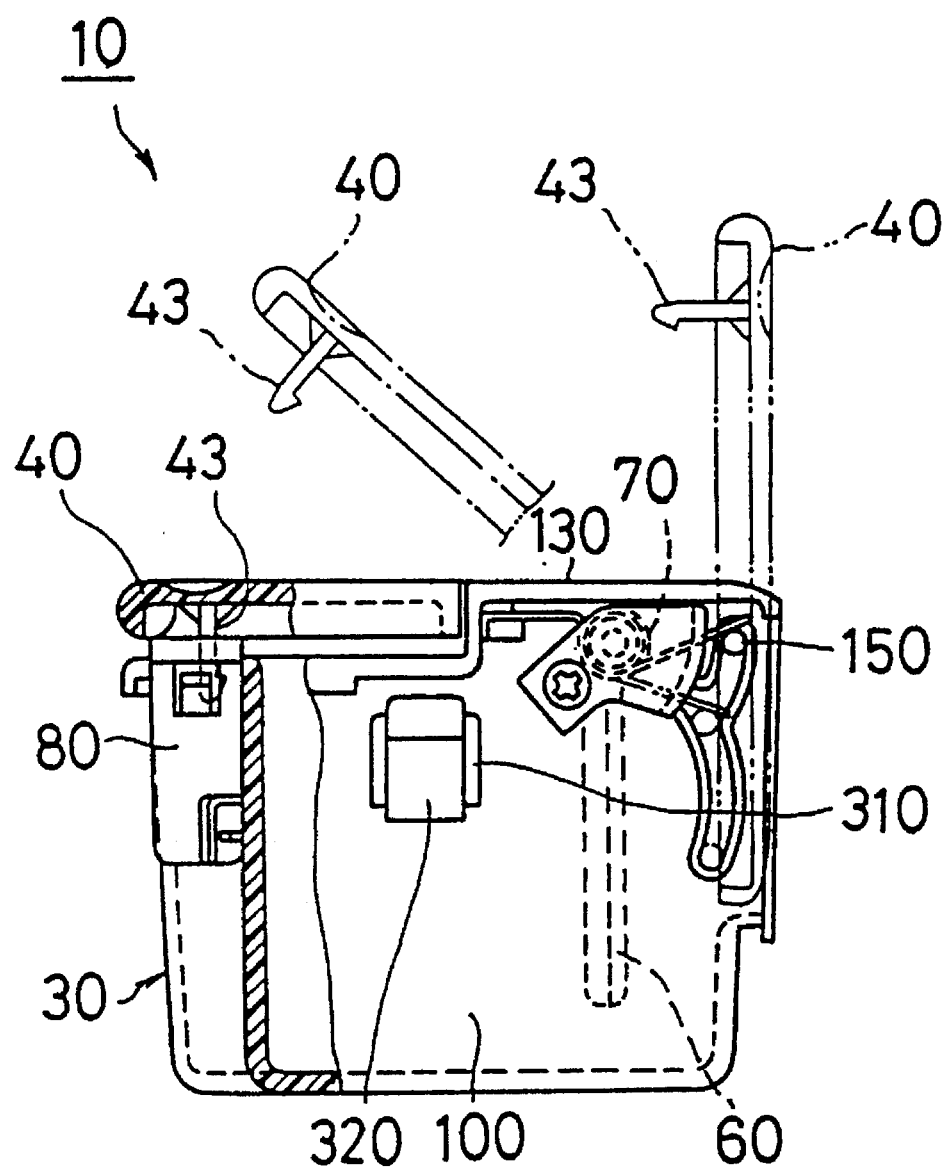
FIG. 17 is a partially-cut front view which illustrates a small article accommodating unit according to a fifth embodiment of the present invention.
Figure 18:
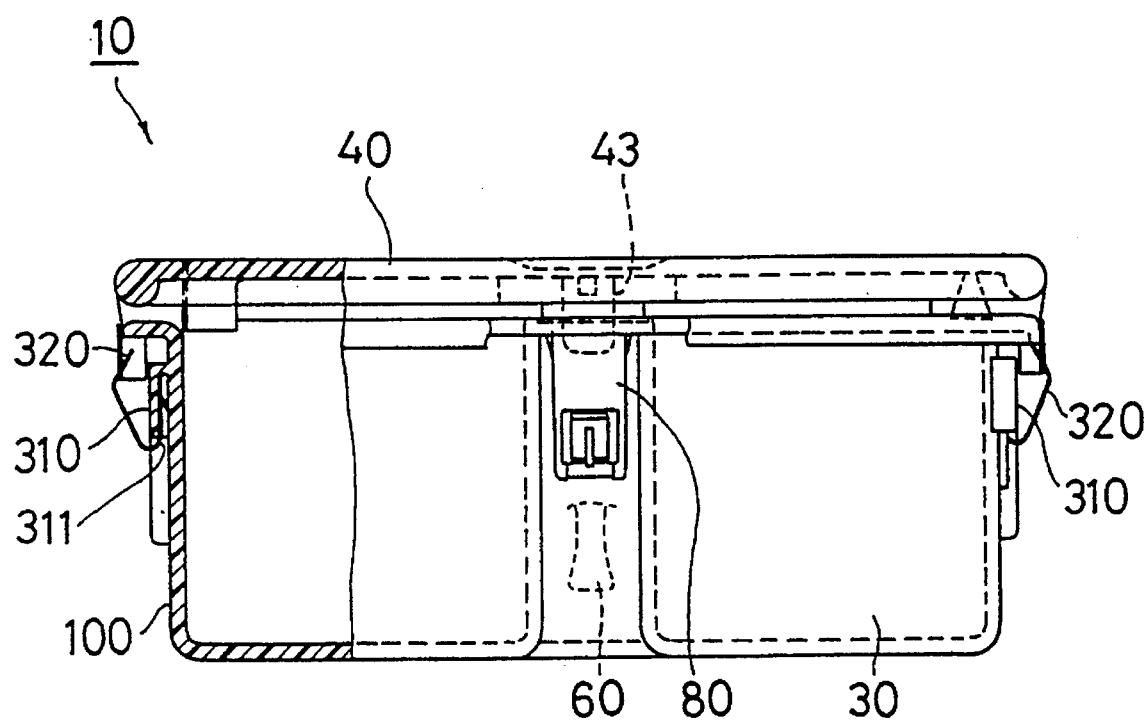
FIG. 18 is a partially-cut side view which illustrates the small article accommodating unit according to the fifth embodiment of the present invention.
Figure 19:
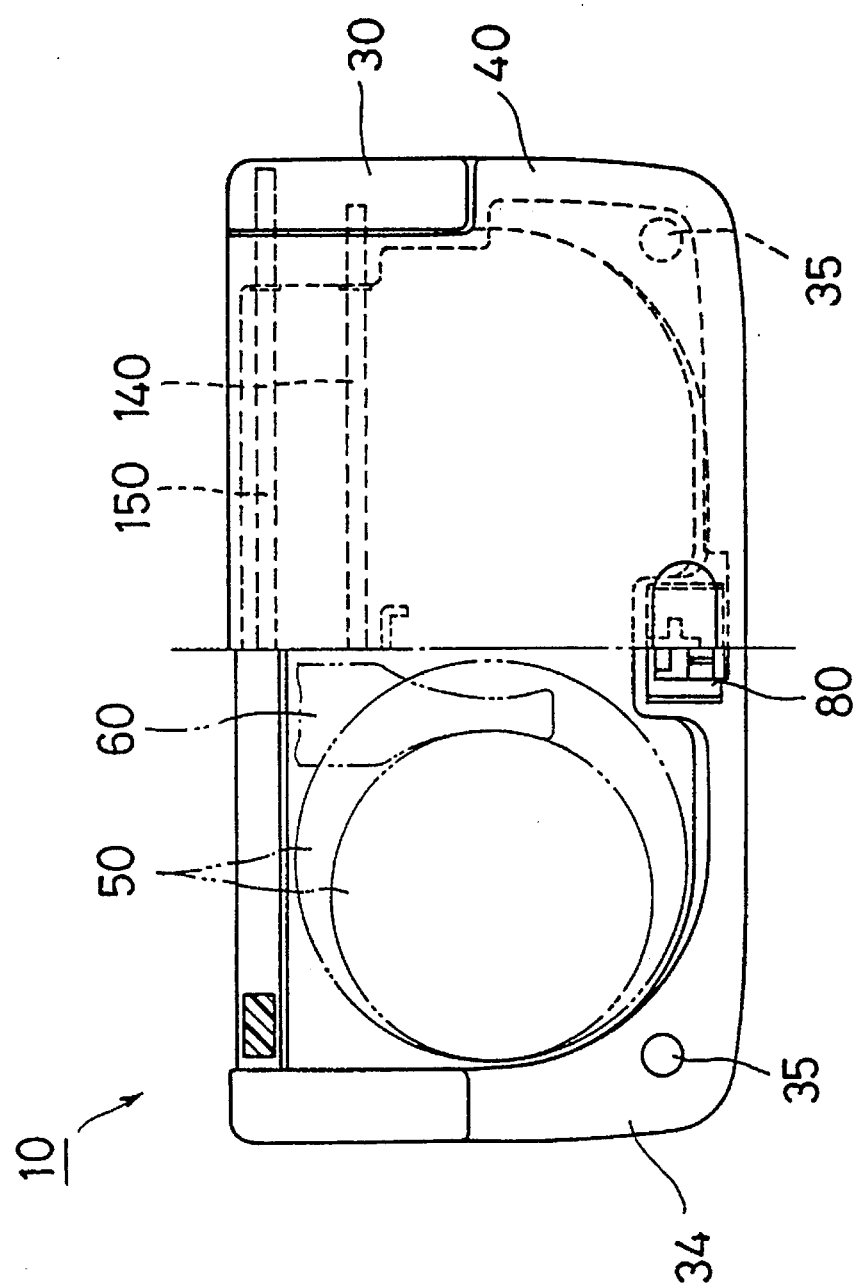
FIG. 19 is a partially-cut plan view which illustrates the small article accommodating unit according to the fifth embodiment of the present invention.
Figure 20:
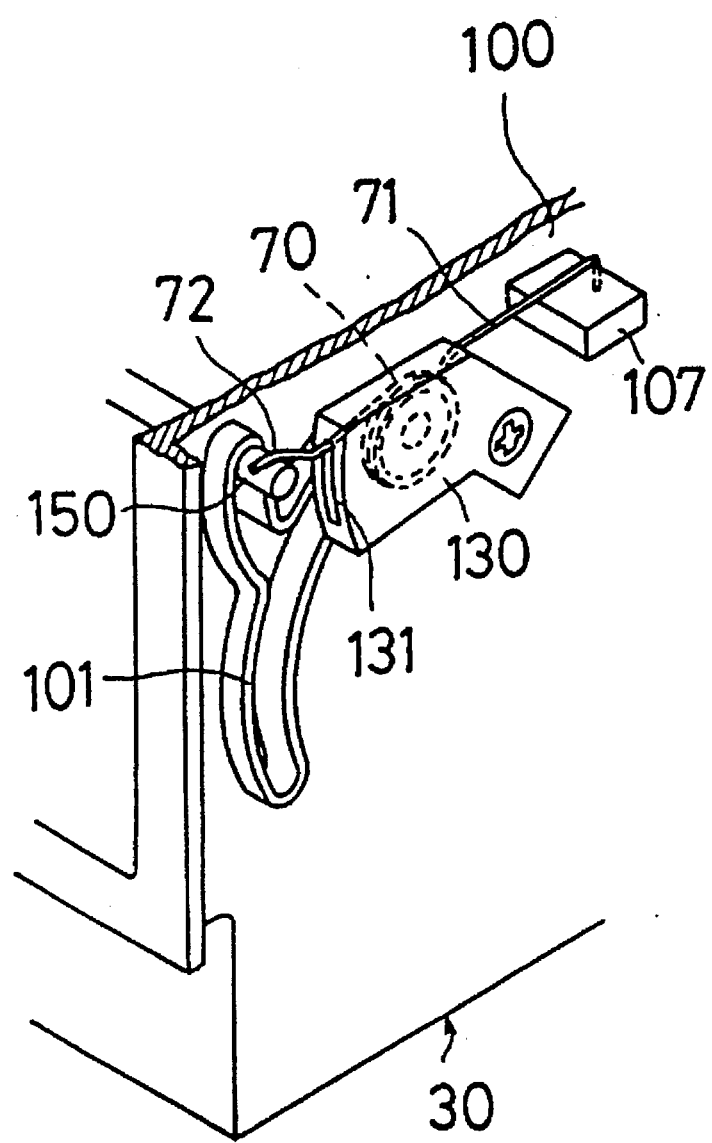
FIG. 20 is a partial perspective view which illustrates caps according to the fifth embodiment of the present invention.
Figure 21:
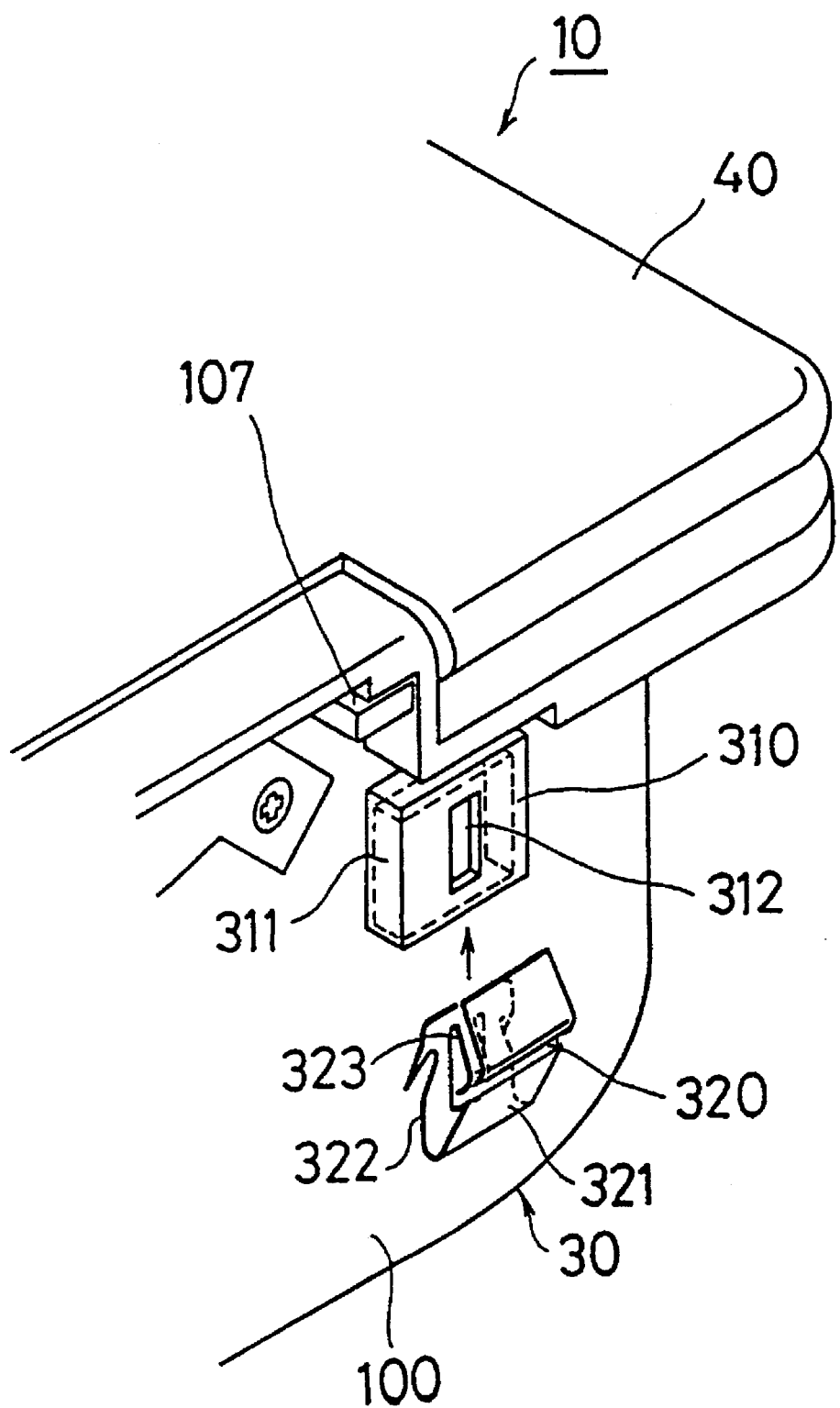
FIG. 21 is a partially exploded perspective view which illustrates a clip according to the fifth embodiment of the present invention.
Figure 22:
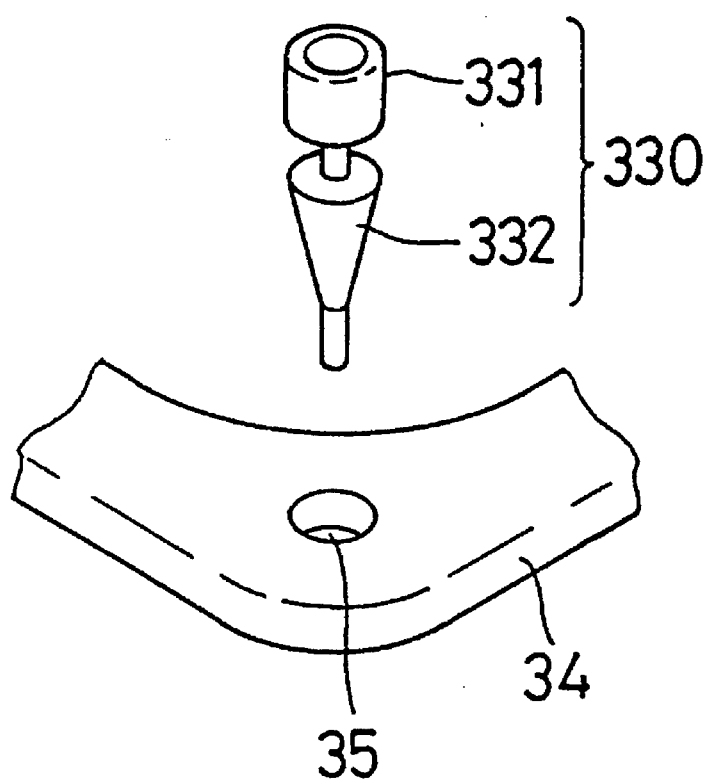
FIG. 22 is a partially exploded perspective view which illustrates a cushion member according to the fifth embodiment of the present invention.

FIGS. 17 to 22 illustrate a fifth embodiment of the present invention. FIG. 17 is a partially broken front view which illustrates a small article accommodating unit according to the fifth embodiment. FIG. 18 is a partially broken side view which illustrates the small article accommodating unit. FIG. 19 is a partially broken plan view which illustrates the small article accommodating unit. FIG. 20 is a partial perspective view which illustrates a cap. FIG. 21 is a partially exploded perspective view which illustrates a clip. FIG. 22 is a partially exploded perspective view which illustrates a cushion member.

This embodiment is characterized by a cap 130.

The cap 130 is formed by a hollow body having an irregular linear shape with the right and left surfaces which are opened as shown in FIG. 20, that is, a hollow interior portion is formed which accommodates the spring 70.

The coil end 71 of the spring 70 extends outwardly through an opening (now shown) in the plane of the hollow portion of the cap 130, as shown in FIG. 20, the coil end 71 being hooked and secured by the stopper 107. The other end 72 of the spring 70 extends outwardly through the other opening indicated as 131 in the plane of the hollow portion of the cap 130 to be a free end which is positioned at substantially the same position of the branching point 103 of the shaft hole 101.

The second shaft 150, which is allowed to pass through the cover 40, as shown in FIG. 20, projects outwardly through the shaft hole 101 of the box 30 to be positioned at the top end of the second branch portion 105 of the shaft hole 101. Furthermore, the free end 72 of the spring 70 is, from an upper position, brought into contact with the second shaft 150 so as to urge it downwardly by the restoring force of the spring 70.

Therefore, the free end 72 of the spring 70 is, as shown in FIG. 20, guided by the opening 131 in the hollow portion of the cap 130 so that the movement of the cap 130 in the direction of the thickness thereof is limited. As a result, engagement and separation of the free end 72 of the spring 70 and the second shaft 150 are ensured, causing the reliability of the small article accommodating unit 10 to be improved.

The clip 320 will now be described with reference to FIG. 21.

The clip 320 is, as shown in FIG. 21, formed by bending a metal plate to have a V-like cross sectional shape. More specifically, the clip 320 is composed of a front member 321 and a rear member 322 in such a manner that the lower ends of the two members 321 and 322 are connected to each other to form the V-like cross sectional shape. The rear member 322 has a fixing claw 323 allowed to project from the front member 321 by cutting the member.

On the other hand, the fixing projection portion 310 on the front and rear walls 100 of the box 30 is, as shown in FIG. 21, formed into a square block shape, the fixing projection portion 310 having an insertion groove 311 containing an opened lower surface into which the rear member 322 of the clip 320 is inserted. Further, the securing projection portion 310 has, on the front surface thereof, a rectangular securing window 312 which penetrates into the insertion groove 311 and to which the securing claw 323 of the rear member 322 of the clip 320 is hooked.

When the rear member 322 of the clip 320 is moved upwardly while being aligned with the insertion groove 311 of the securing projection portion 310 of the box 30, as shown in FIG. 21, the securing claw 323 is snapped into the securing window 312. As a result, the rear member 322 cannot easily be separated from the opened lower surface of the insertion groove 311 (see FIG. 18). As a result, the metal clip 320 can be attached to the box 30 with one touch of a finger.

The cushion member 330 will now be described with reference to FIG. 22.

The cushion member 330 is, as shown in FIG. 22, composed of a cylindrical head portion 331 and a leg portion 332 hanging from the head portion 331, the leg portion 332 being formed into a substantially conical shape. The cushion member 330 is made of, for example, rubber exhibiting excellent elasticity.

On the other hand, the box 30 has, as shown in FIG. 22, flange portions 34 projecting outwards from the top end of the box 30. The flange portions 34 have a pair of right and left securing through holes 35 in the form of a circular shape, each of the securing holes 35 having an outer diameter somewhat smaller than that of the leg portion 322 of the cushion member 330.

Therefore, downward movement of the leg portions 332 of the cushion members 330, while being aligned to the securing holes 35 of the box 30, cause the two cushion members 330 by use of their elastic characteristics to be attached to the two securing holes 35.

As a result, the reverse side of the cover 40 is, in a state where the cover 40 is closed, elastically brought into contact with the top surfaces of the head portions 331 of the cushion members 330 so that looseness of the cover 40 is prevented.

In the description of the fifth embodiment, the same components as those of the first embodiment are given the same reference numerals, and their specific descriptions are omitted here.

Although the foregoing illustrated embodiments comprise the locking means composed of the latch unit 80 and the strike 43 which can be engaged to the latch unit 80, the present invention is not limited to this. The locking means may be composed of a hook capable of performing a similar operation and a locking pin or the like which is engaged to the hook.

Although the safety device 210 serving as the safety means is included in the latch unit 80, the present invention is not limited to this. The safety device may be disposed individually from the latch unit.

Figure 23:
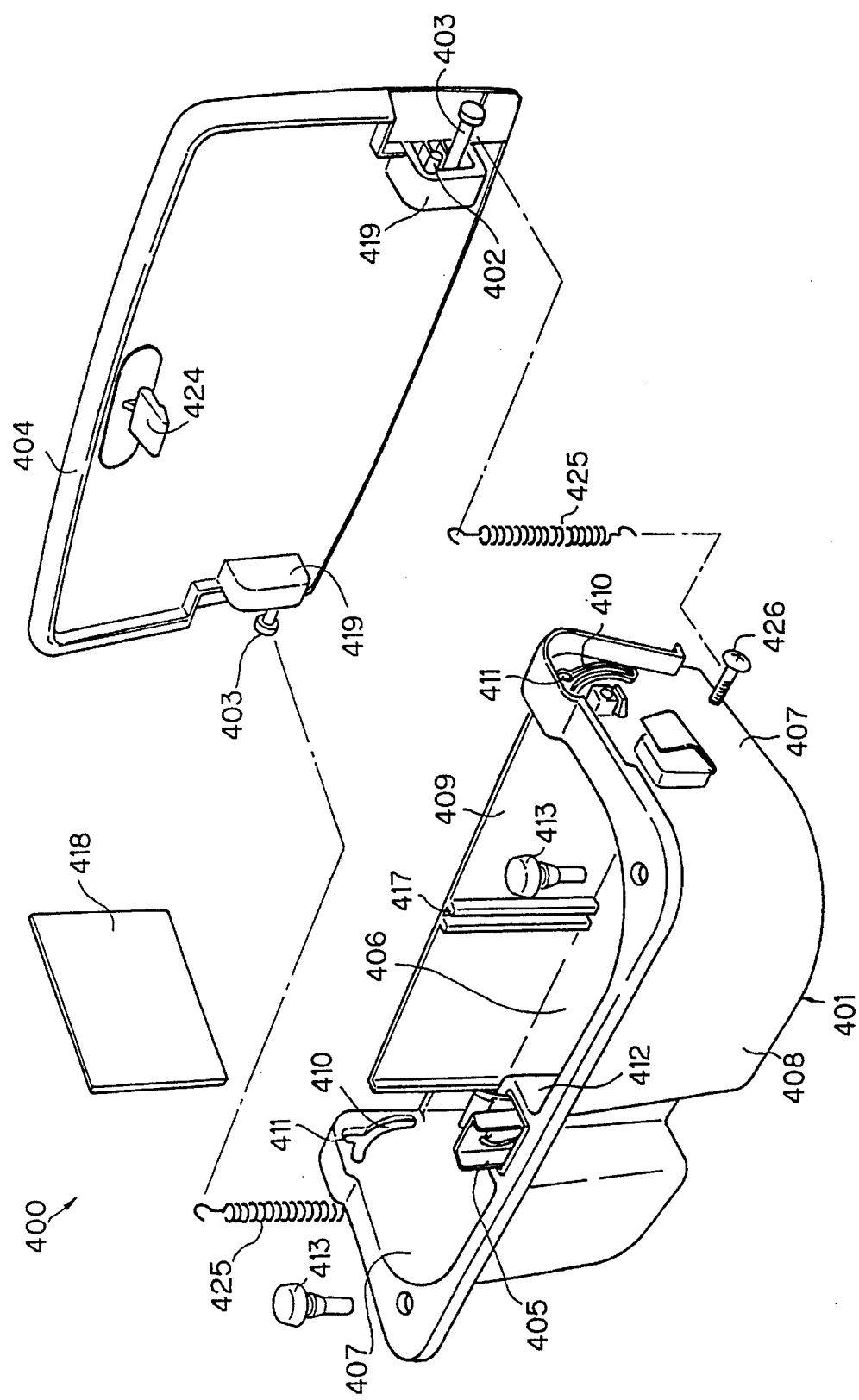
FIG. 23 is an exploded perspective view which illustrates a small article accommodating unit according to a sixth embodiment of the present invention.
Figure 24:
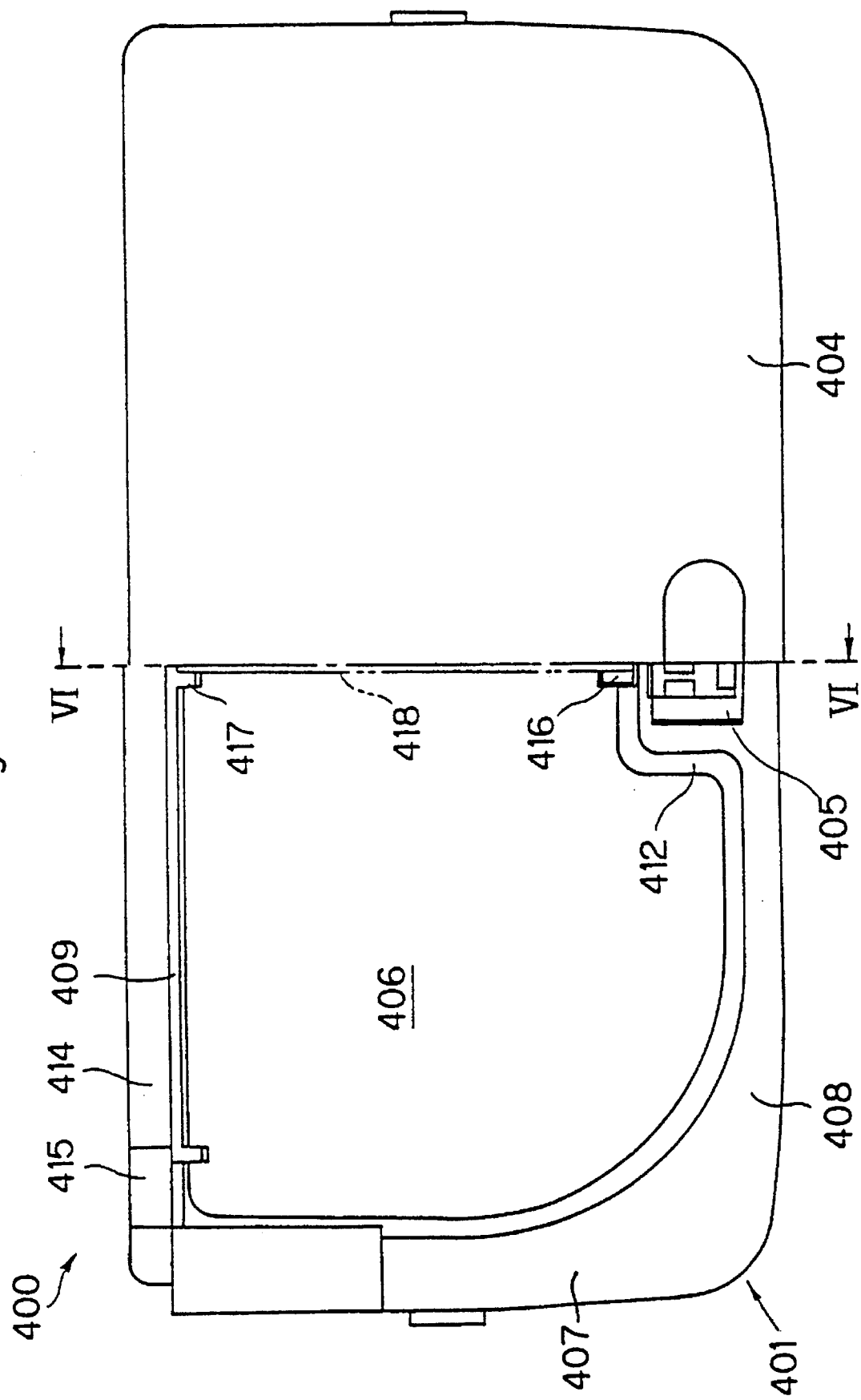
FIG. 24 is a partially-cut plan view which illustrates a cover of the small article accommodating unit according to the sixth embodiment of the present invention.
Figure 25:
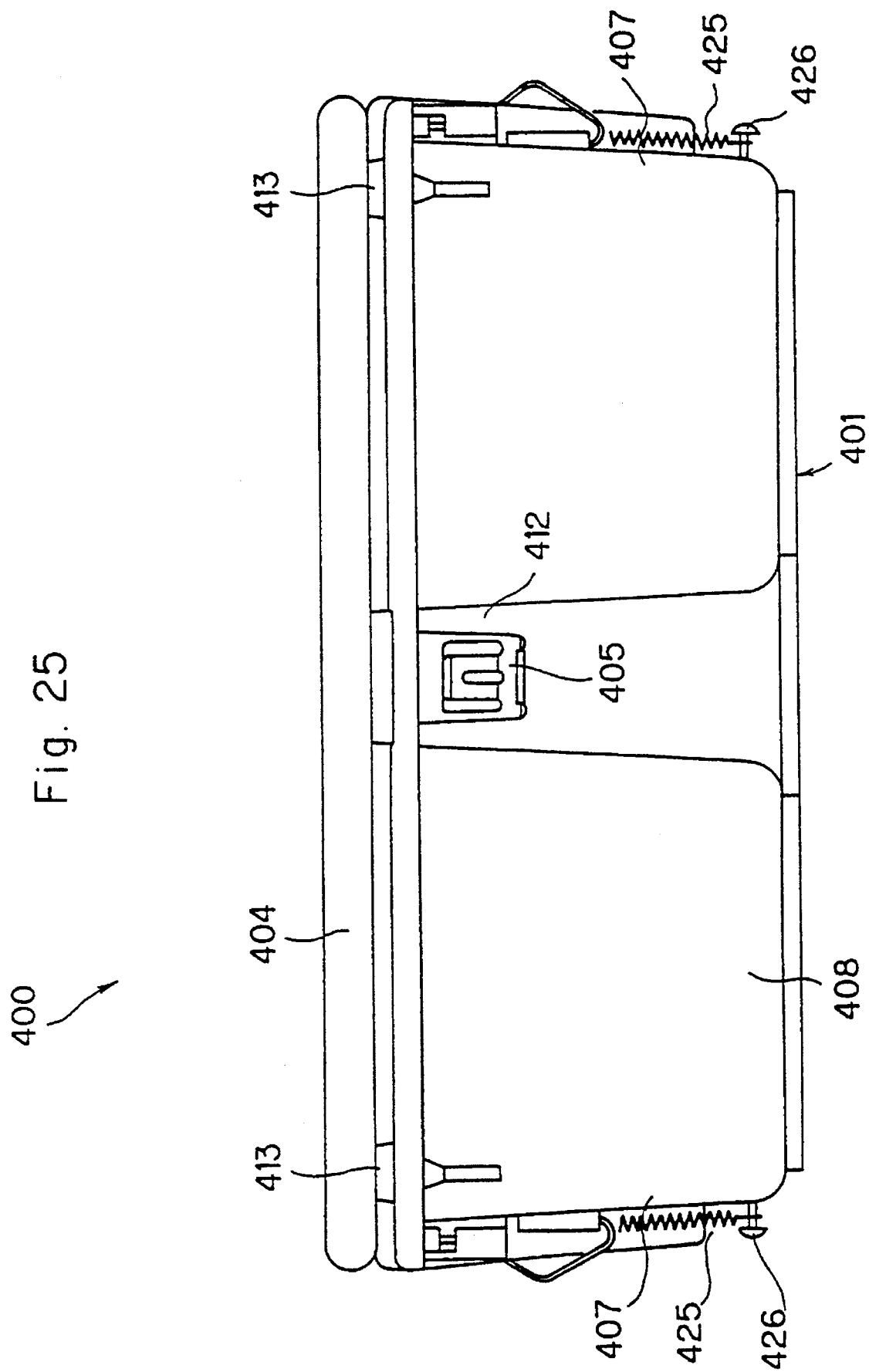
FIG. 25 is a front view which illustrates the small article accommodating unit according to the sixth embodiment of the present invention.
Figure 26:
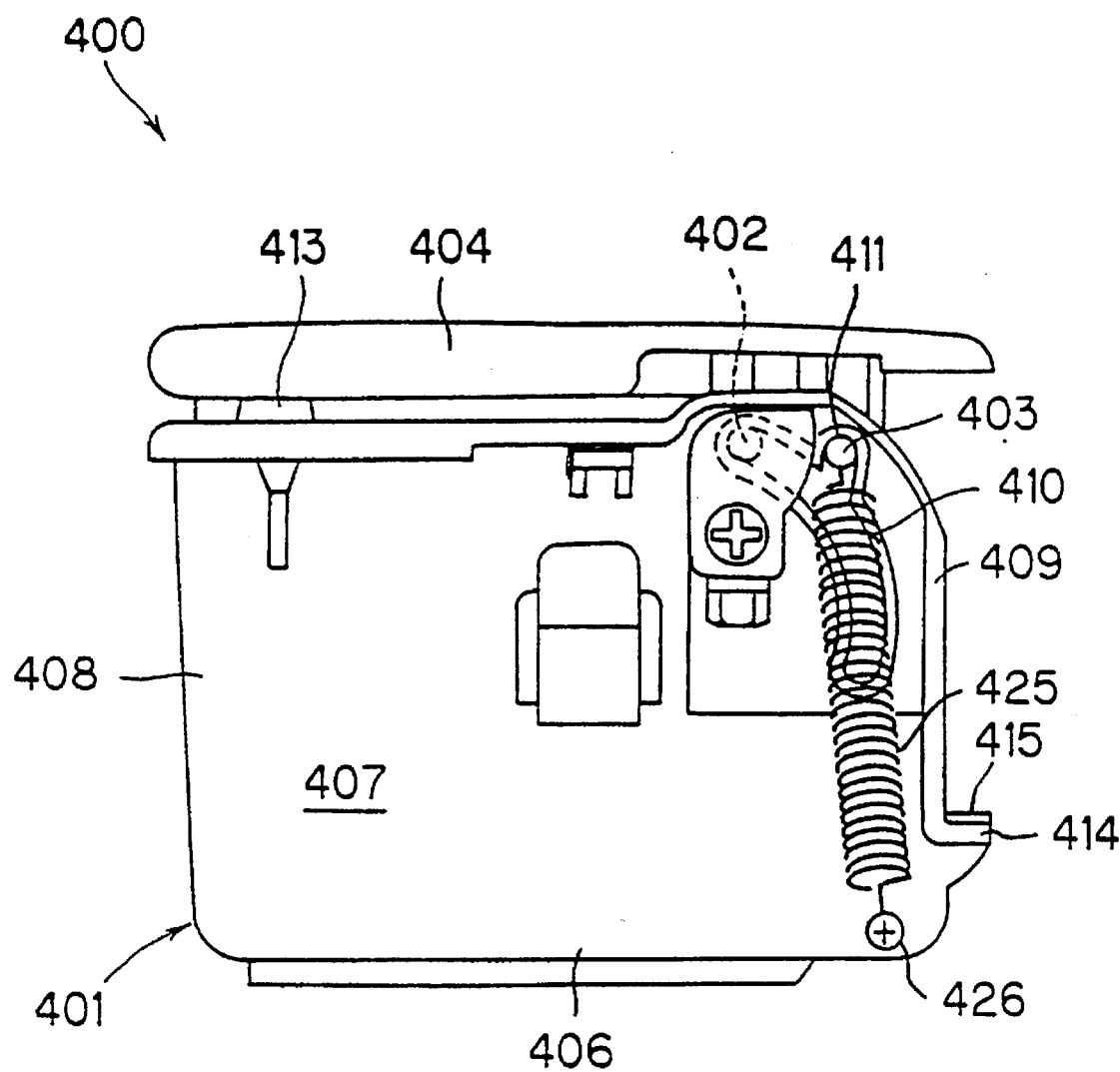
FIG. 26 is a side view which illustrates the small article accommodating unit according to sixth embodiment of the present invention.
Figure 27:
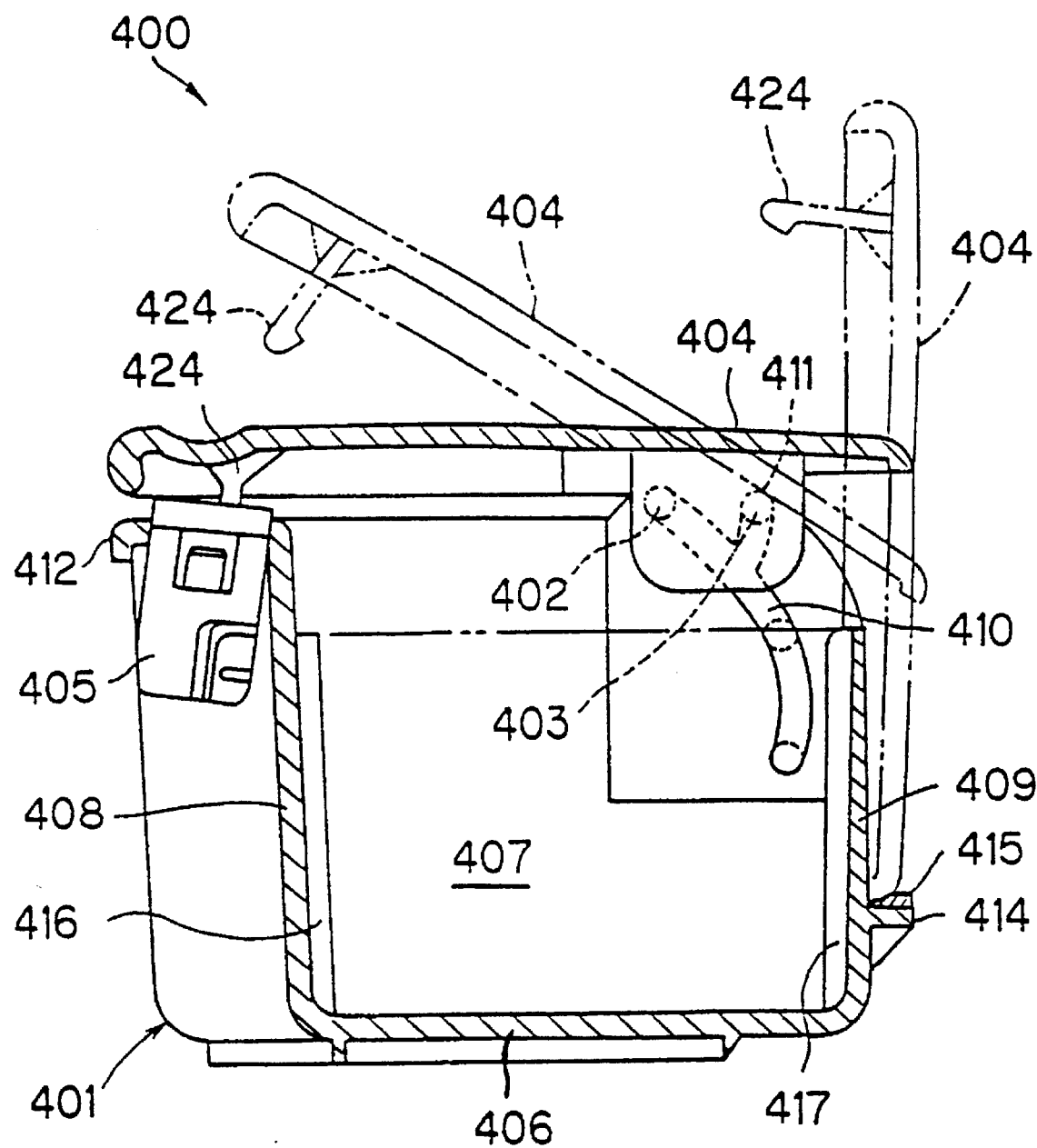
FIG. 27 is a cross sectional view taken along line VI—VI shown in FIG. 24.

FIGS. 23 to 27 illustrate a sixth embodiment of the present invention. FIG. 23 is an exploded perspective view which illustrates the small article accommodating unit according to this embodiment. FIG. 24 is a partially-cut plan view which illustrates a cover of the small article accommodating unit. FIG. 25 is a front view which illustrates the small article accommodating unit. FIG. 26 is a side view which illustrates the small article accommodating unit. FIG. 27 is a cross sectional view taken along line VI—VI shown in FIG. 24.

Referring to the drawings, reference numeral 400 represents the small article accommodating unit. The small article accommodating unit 400 is, as shown in FIG. 2, secured in the center console 20 formed between the driver's seat and an assistant's seat of a vehicle while being embedded in the center console 20.

Referring to FIG. 2, reference numeral 21 represents a console box 21, 22 represents a side brake, 23 represents a steering wheel and 24 represents a seat.

The small article accommodating unit 400, as shown in FIG. 23, mainly comprises a hollow box 401 having an opened top surface, a cover 404 rotatively supported in the box 401 around two rotation shafts 402 and 403 for opening/closing the opened top surface of the box 401, and a locking means, such as a latch unit 405 capable of locking the cover 404 at its closed position and suspending the locking state when the cover 404 is pressed from the closed position.

The box 401 is, as shown in FIG. 23, formed into a hollow box shape having an opened top surface, the box 401 being made of, for example, thermosetting resin exhibiting excellent elasticity by integral molding.

More specifically, the box 401 is, as shown in FIG. 23, composed of a bottom wall 406, a pair of right and left walls 407 disposed in the right portion and the left portion when viewed in FIG. 23, a front wall 408 disposed adjacent to a user and a rear wall 409 disposed relatively apart from the user.

A guide groove 410 for rotatively guiding the two rotation shafts 402 of the cover 404 is formed in each of the right and left walls 407.

Each of the guide grooves 410 is, as shown in FIG. 23, formed in a Y-like shape penetrating the inner and outer surfaces of each of the right and left walls 407. More specifically, each of the guide grooves 410 is extended vertically while being gently curved to form a C-like shape, each of the guide grooves 410 having a branch passage 411 branched in the form of a Y-like shape having a short length and extended upwards.

The front wall 408 has, as shown in FIG. 23, a latch securing portion 412 for securing the latch unit 405. The latch securing portion 412 is projected over the inner surface of substantially the central portion of the front wall 408, the latch securing portion 412 having a U-shape cross sectional shape facing the inside portion of the box 401.

Further, a pair of right and left cushion members 413 are, as shown in FIG. 25, secured to the top surface of the front wall 408 which projects outwards, the cushion member 413 with which the inner surface of the closed cover 404 is elastically brought into contact. The presence of the two cushion members 413 is able to prevent noise generation due to looseness caused from the direct contact of the inner surface of the cover 404 with the end of the front wall 408 in a state where the box 401 has been closed.

The rear wall 409 has, as shown in FIGS. 24, 26 and 27, a limiting portion 414 serving as a limiting means with which the rear end of the opened cover 404 is brought into contact with so that the maximum position at which the cover 404 can be opened is limited.

The limiting portion 414 is, as shown in FIGS. 24, 26 and 27, formed into a square shape projecting rearwards over the lower portion of the outer surface of the rear wall 409 to have a T-shape cross sectional shape. Further, a pair of right and left vibration isolating rubbers 415 are secured onto the top surface of the limiting portion 414. The rear ends of the opened cover 404 are elastically brought into contact with the two vibration isolating rubbers 415. As a result, generation of noise caused from looseness, which takes place due to the direct contact of the rear end of the cover 404 with the limiting portion 414, can be prevented.

Further, mutually opposing partition grooves 416 and 417 are, as shown in FIGS. 23 and 24, formed in the corresponding front wall 408 and the rear wall 409 which oppose each other. By inserting a partition plate 418 into the two partition grooves 416 and 417 from above, the space in the box 401 can be laterally divided into two sections.

The cover 404 is formed into a rectangular plate-like shape extending laterally and having a size somewhat larger than the top plane of the opened box 401. The cover 404 is, similarly to the box 401, made of thermosetting resin exhibiting excellent rigidity by integral molding.

A pair of right and left bearing portions 419 are, as shown in FIG. 23, formed on the two side portions at the rear end of the cover 404, the bearing portions 419 projecting over the inner surface of the cover 404 have a tongue-like shape.

Short first rotation shafts 402 disposed in a forward position of the bearing portions 419 and second rotation shafts 403 positioned behind the first rotation shafts 402 and longer than the first rotation shafts 402 are, as shown in FIG. 23, secured to the right and left bearing portions 419 in such a manner that the two rotation shafts 402 and 403, respectively, project to face outside in lateral directions. The two rotation shafts 402 and 403 are made of metal and received and held by the guide grooves 410 formed in the box 401 so that the two rotation shafts 402 and 403 are able to move in the longitudinal direction of each guide groove 410. It should be appreciated that, the long second rotation shafts 403 are made to project somewhat beyond the respective guide grooves 410.

That is, the first rotation shafts 402 are positioned at substantially the top ends of the guide grooves 410 and the second rotation shafts 403 are spaced from the first rotation shafts 402 and positioned at substantially the top ends of the branch passages 411 of the guide groove 410, as shown in FIGS. 26 and 27.

When the cover 404 is opened initially, the cover 404 is, as designated by alternate long and two short dash lines shown in FIG. 27, turned around the first rotation shafts 402 which are made substantially stationary. At this time, the second rotation shafts 403 are introduced from the branch passages 411 into the guide grooves 410 while being moved downwards.

When the cover 404 has been further opened, the cover 404 is turned around the second rotation shafts 403 as designated by the alternate long and two short dash lines shown in FIG. 27. Since the second rotation shafts 403 are moved downwards along the guide grooves 410 at this time, the cover 404 is moved downwards in a substantially vertical direction while being opened.

When the cover 404 is brought into contact with the vibration isolating rubbers 415 secured by the limiting portions 414 projecting over the outer surface of the rear wall 409 of the box 401 as designated by the alternate long and two short dash lines shown in FIG. 27, turning of the cover 404 is stopped. The foregoing state is the maximum position at which the cover 404 can be opened.

The free end of the cover 404 has, as shown in FIG. 23, a strike 424 formed with a rectangular shape projecting over the substantially central position of the inner surface of the cover 404.

The strike 424 is engaged to the latch unit 405 secured to the latch securing portion 412 of the box 401 when the cover 404 is closed as shown in FIG. 27.

The latch unit 405 comprises a so-called embossed latch using a heart-shape (omitted from illustration) cam groove. The latch unit 405 is depressed by the strike 424 when the cover 404 is closed to receive the strike 424 so that it locks the cover 404 into the closed state. When the cover 404 is further depressed over the closed position, the locked state of the latch unit 405 is suspended. Then, the restoring force of a coil spring (omitted from illustration), or the like, disposed in the latch unit 405 slightly pushes back the strike 424. As a result, the cover 404 is somewhat opened so that the cover 404 can be opened.

Further, a holding means for holding the cover 404 at the maximum position to which the cover 404 can be opened is disposed between the box 401 and the cover 404.

The holding means according to this embodiment, as shown in FIGS. 23 and 26, comprises a tension spring 425. That is, the tension of the tension spring 425 is utilized to urge the cover 404 always in a direction in which the cover 404 is opened. As a result, the cover 404 is, due to the tension of the tension spring 425, always brought into contact with the vibration isolating rubbers 415 secured to the limiting portion 414 disposed at the rear end of the box 401 when the cover 404 is opened. Therefore, undesirable closing of the opened cover 404 or generation of looseness due to the contact with the box 401, which can be caused from vibrations of a vehicle, can be prevented.

Two tension springs 425 are, as shown in FIG. 23, used. An end of each tension spring 425 is, as shown in FIG. 26, secured to the lateral leading portion of each of the second rotation shafts 403 projecting from each guide groove 410 of the box 401. The opposite end of each tension spring 425 is secured to a spring securing member 426, such as screws driven into the right and left side walls 407 of the box 401. The spring securing members 426 are located substantially immediately below the guide grooves 410.

Although the tension of each of the tension springs 425 is sufficient to urge the opened cover 404 toward the vibration isolating rubbers 415 of the box 401, this embodiment has an arrangement that the tension of each tension spring 425 opens the cover 404 to its maximum position of opening when the closed cover 404 is somewhat opened by the latch unit 405 when the cover 404 is opened.

The procedure of use of the assembled small article accommodating unit 400 having the foregoing structure will now be described.

In order to open the closed cover 404, as shown in FIGS. 24 to 27, the top surface of the cover 404 must be somewhat depressed. When the cover 404 has been depressed, the latch unit 405 is pressed by the strike 424 of the cover 404, and therefore the locking state realized by the latch unit 405 is suspended.

As a result, the cover 404 is, as designated by the alternate long and two short dash lines shown in FIG. 27, opened to its maximum position due to the tension of the tension springs 425.

Figure 28:
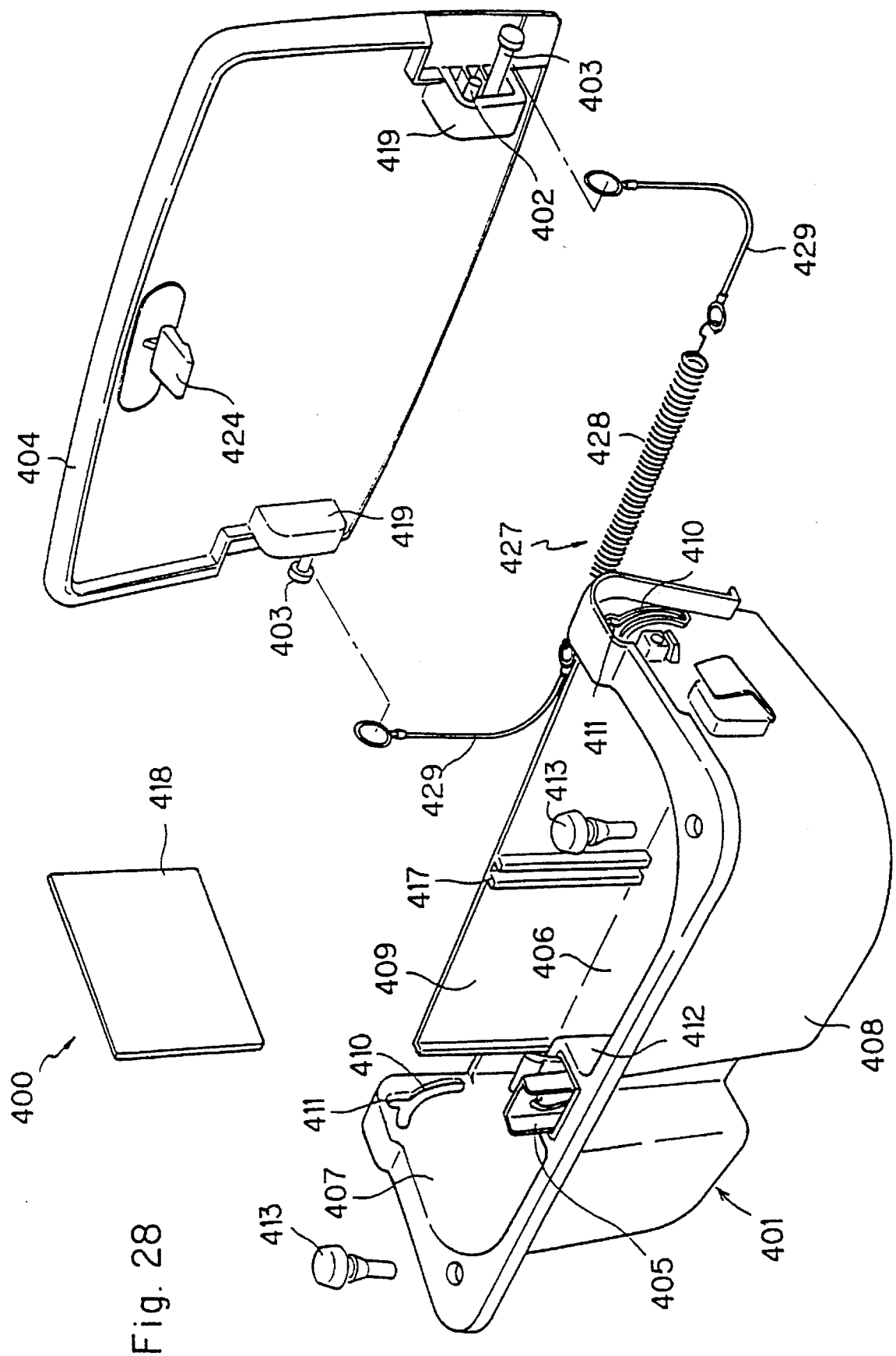
FIG. 28 is an exploded perspective view which illustrates a small article accommodating unit according to a seventh embodiment of the present invention.

In the thus-realized state of opening, the cover 404 is, as designated by the alternate long and two short dashes line shown in FIG. 28, always elastically brought into contact with the vibration isolating rubbers 415 of the box 401. Therefore, undesirable closing of the opened cover 404 or generation of looseness due to the contact with the box 401, which can be caused from vibrations of a vehicle, can be prevented.

In order to close the opened cover 404, it must be closed in such a manner that the outer surface of the cover 404 is pressed against the box 401.

When the cover 404 has been closed, the strike 424 projecting over the inner surface of the cover 404 is engaged to the latch unit 405 secured to the box 401, as shown in FIG. 27. If the cover 404 is further depressed toward the box 401, the latch unit 405 is pressed inwards by the strike 424, and latch unit 405 receives the strike 424 so that the cover 404 is locked. Therefore, the cover 404 is locked to the closed position against the tension of each of the tension springs 425.

FIG. 28 is an exploded perspective view which illustrates a seventh embodiment of the small article accommodating unit according to the present invention.

This embodiment is characterized by an arrangement in which the holding means comprises one tension spring 427.

That is, an end of one tension spring 427 is, as shown in FIG. 28, secured to the leading portion of one of the right and left second rotation shafts 403. Further, another end of the tension spring 427 is allowed to pass through a position below the bottom wall 406 of the box 401 and secured to the leading portion of the opposite one of the right and the left second rotation shafts 403. As a result, the cover 404 is always urged due the tension of the tension spring 427 in a direction in which the cover 404 is opened.

More specifically, the tension spring 427 is, as shown in FIG. 28, composed of a spring body 428 and a pair of right and left extending wires 429 respectively connected to the two ends of the spring body 428. Further, the length of the spring body 428 is made shorter than the lateral length of the bottom wall 406 of the box 401. The length of each of the extending wires 429 is determined in such a manner that the tension of the spring body 428 acts on the cover 404 in a state where the cover 404 is closed. It should be noted that this embodiment is organized such that the cover 404 is opened to its maximum position of opening by the tension of the spring body 428 when the closed cover 404 has been slightly opened by the latch unit 405 upon opening the cover 404.

In the description of this embodiment, the same components as those of the foregoing sixth embodiment are given the same reference numerals and their specific descriptions are omitted here.

According to this embodiment, only one tension spring 427 is required and the necessity of forming the spring securing portion 426 in the box 401 can be eliminated as is required in the foregoing embodiment. Therefore, the structure and assembling can be simplified.

Figure 29:
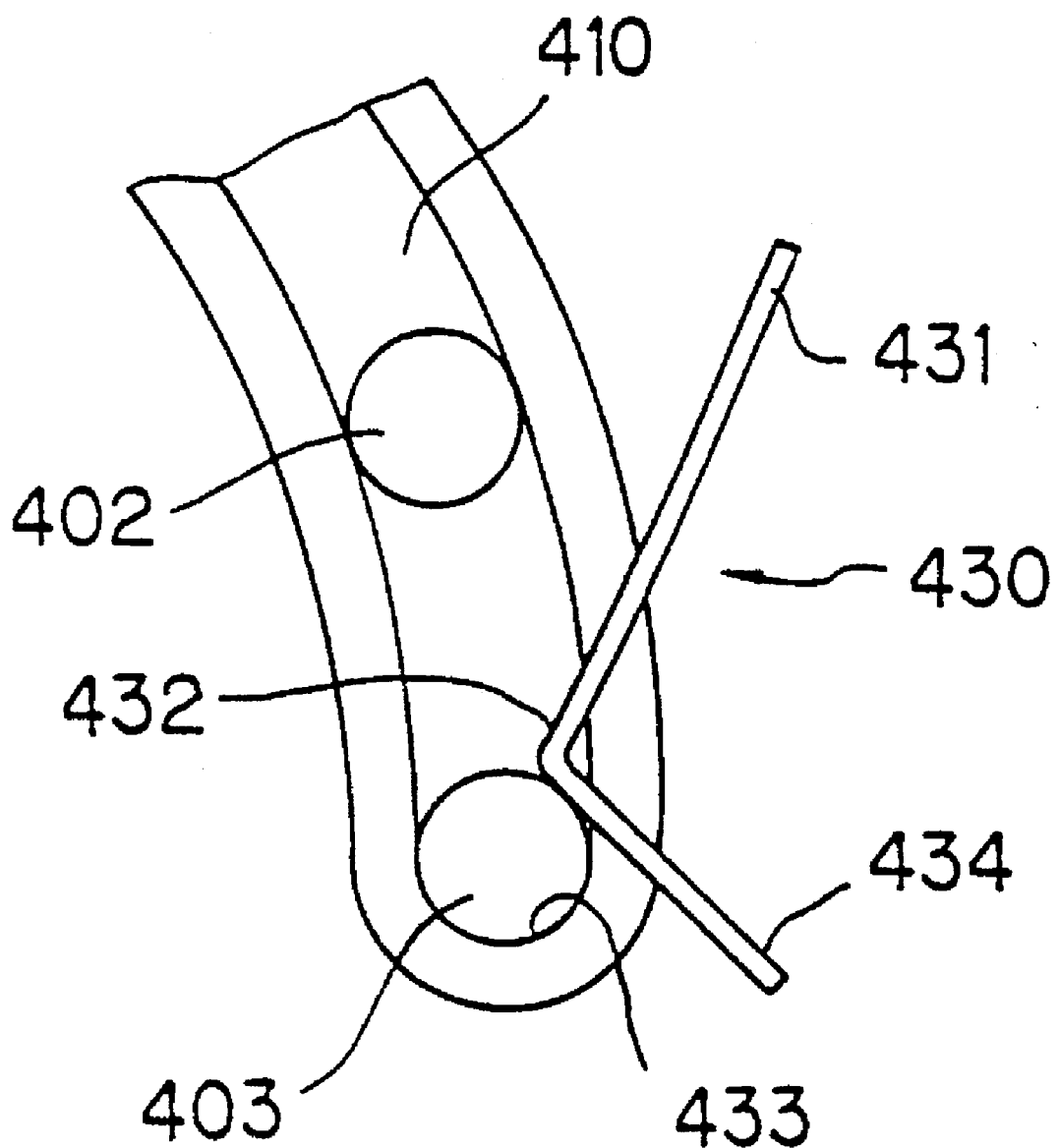
FIG. 29 is an enlarged view which illustrates an essential portion of a small article accommodating unit according to an eighth embodiment of the present invention.

FIG. 29 is an enlarged view which illustrates an eighth embodiment of the small article accommodating unit according to the present invention.

This embodiment is characterized in that a leaf spring 430 is used to serve as the holding means.

That is, one leaf spring 430 is used in each of the right and left sides of the box 401. Each of the leaf springs 430 is bent to form an L-shape, as shown in FIG. 29.

Each of the leaf springs 430 is disposed in such a manner that its end, for example, an upper base portion 431 is secured to the outer surface of the side wall 407 of the box 401 and a wedge-like bent portion 432 is allowed to project toward the guide groove 410 of the side wall 407. The bent portion 432 of each of the leaf springs 430 is engaged to the second rotation shaft 403 of the cover 404 so that the second rotation shaft 403 is pressed against a U-shaped contact portion 433 formed at the lower end of the guide groove 410 when the cover 404 has been opened to its maximum opening position. It should be noted that the opposite end of each of the leaf springs 430 is formed into a free end 434.

In the description of this embodiment, the same components as those of the foregoing sixth embodiment are given the same reference numerals and their specific descriptions are omitted here.

According to this embodiment, the second rotation shafts 403 of the cover 404 are brought into contact with the bent portions 432 of the leaf springs 430 projecting toward the guide grooves 410 immediately before the cover 404 is closed by the hand. If the cover 404 is closed with a strong force by the hand in the foregoing state, the second rotation shafts 403 of the cover 404 press the bent portions 432 of the leaf springs 430 so that the bent portions 432 are retracted from the guide grooves 410.

As a result, the second rotation shafts 403 are allowed to pass through the bent portions 432 and brought into contact with the contact portions 433 of the guide grooves 410. The leaf springs 430 are, as shown in FIG. 29, restored in a snap manner, causing the bent portion 432 to again project toward the guide grooves 410.

Therefore, the second rotation shafts 403 of the cover 404 are blocked by the bent portions 432 of the leaf springs 430 which have projected toward the guide groove 410 so that the second rotation shafts 403 cannot be moved from the maximum position of opening in the closing direction. As a result, the cover 404 can be held at its maximum position of opening.

Also in this embodiment, undesirable closing of the opened cover 404 or generation of looseness due to the contact with the box 401, which can be caused from vibrations of a vehicle, can be prevented.

In order to close the cover 404, it can be closed by the hand with a force greater than that generated by the springs 430 because the second rotation shafts 403 of the cover 404 press the bent portions 432 of the leaf springs 430 so that the bent portions 432 are retracted and the shafts 403 allowed to pass the bent portions 432.

Although the leaf springs 430 are employed in this embodiment, the present invention is not limited to the leaf springs if the employed material is elastic material such as a coil spring or rubber. The necessity is that the employed structure elastically projects toward the guide grooves 410 and are retracted from the guide grooves 410 when it is pressed by the second rotation shafts 403.

Figure 30:
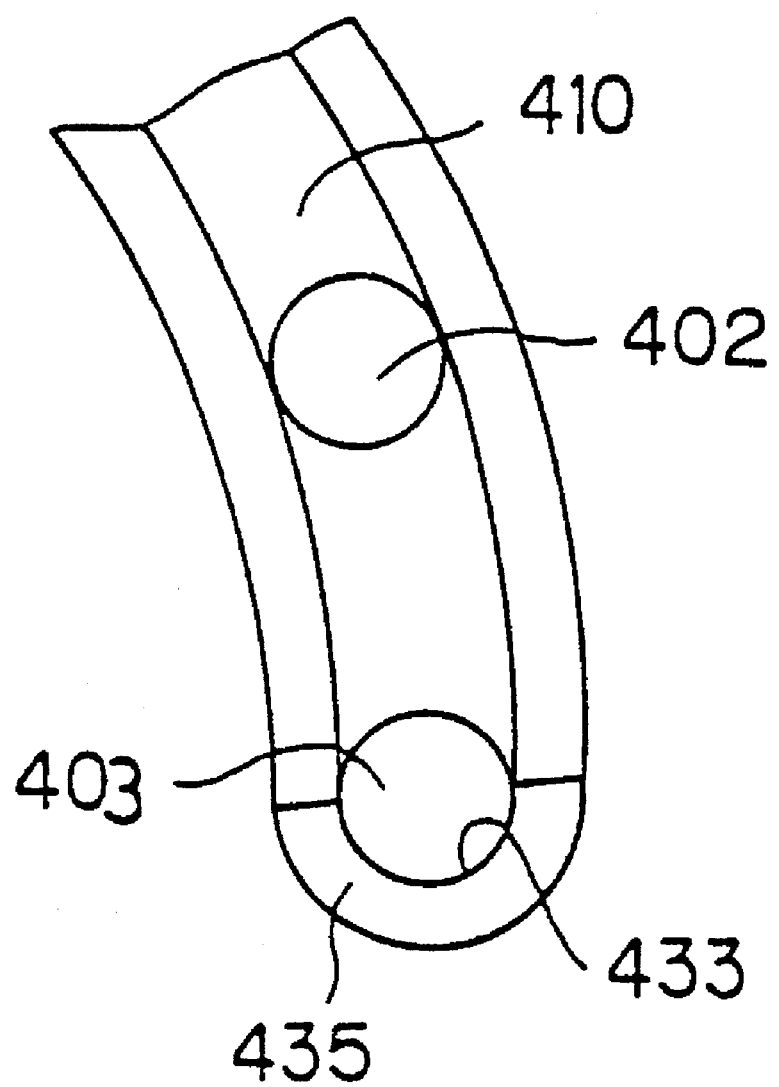
FIG. 30 is an enlarged view which illustrates an essential portion of a small article accommodating unit according to a ninth embodiment of the present invention.

FIG. 30 is an enlarged view which illustrates an essential portion of a ninth embodiment of the small article accommodating unit according to the present invention.

This embodiment is characterized in that magnets 435 are employed to serve as the holding means.

That is, one magnet 435 is used in each of the right and left sides of the box 401. Each magnet 435 is bent to have a U-shape along the U-shape contact portion 433 formed at the lower end of the guide groove 410. Further, the magnets 435 are secured along the edges of the U-shape contact portions 433 of the guide grooves 410.

As a magnetic member to be attracted by each magnet 435, a second rotation shaft 403 made of metal of the cover 404 is utilized.

In the description of this embodiment, the same components as those of the foregoing sixth embodiment are given the same reference numerals and their specific descriptions are omitted here.

According to this embodiment, when the cover 404 is opened to its maximum position of opening, the second rotation shafts 403 made of metal are attracted by the magnets 435 secured to the contact portions 433 of the guide grooves 410. Therefore, the cover 404 can be maintained at its maximum position of opening by the attractive force of the magnets 438.

Therefore, also in this embodiment, undesirable closing of the opened cover 404 or generation of looseness due to the contact with the box 401, which can be caused from vibrations of a vehicle, can be prevented similarly to the sixth embodiment.

When the cover 404 is closed, the cover 404 may be closed by hand by applying a stronger force against the attractive force of the magnets 435.

Although this embodiment is arranged in such a manner that the magnets 435 are secured to the box 401 and the second rotation shafts 403 made of metal are used as the magnetic members, the present invention is not limited to this. The necessity is that the magnet is secured to at least either of the box 401 or the cover 404 and a magnetic member, such as a metal member or a magnet is secured to at least either of the corresponding box 401 or the cover 404 in a range on which the attractive force of the former magnet acts.

Figure 31:
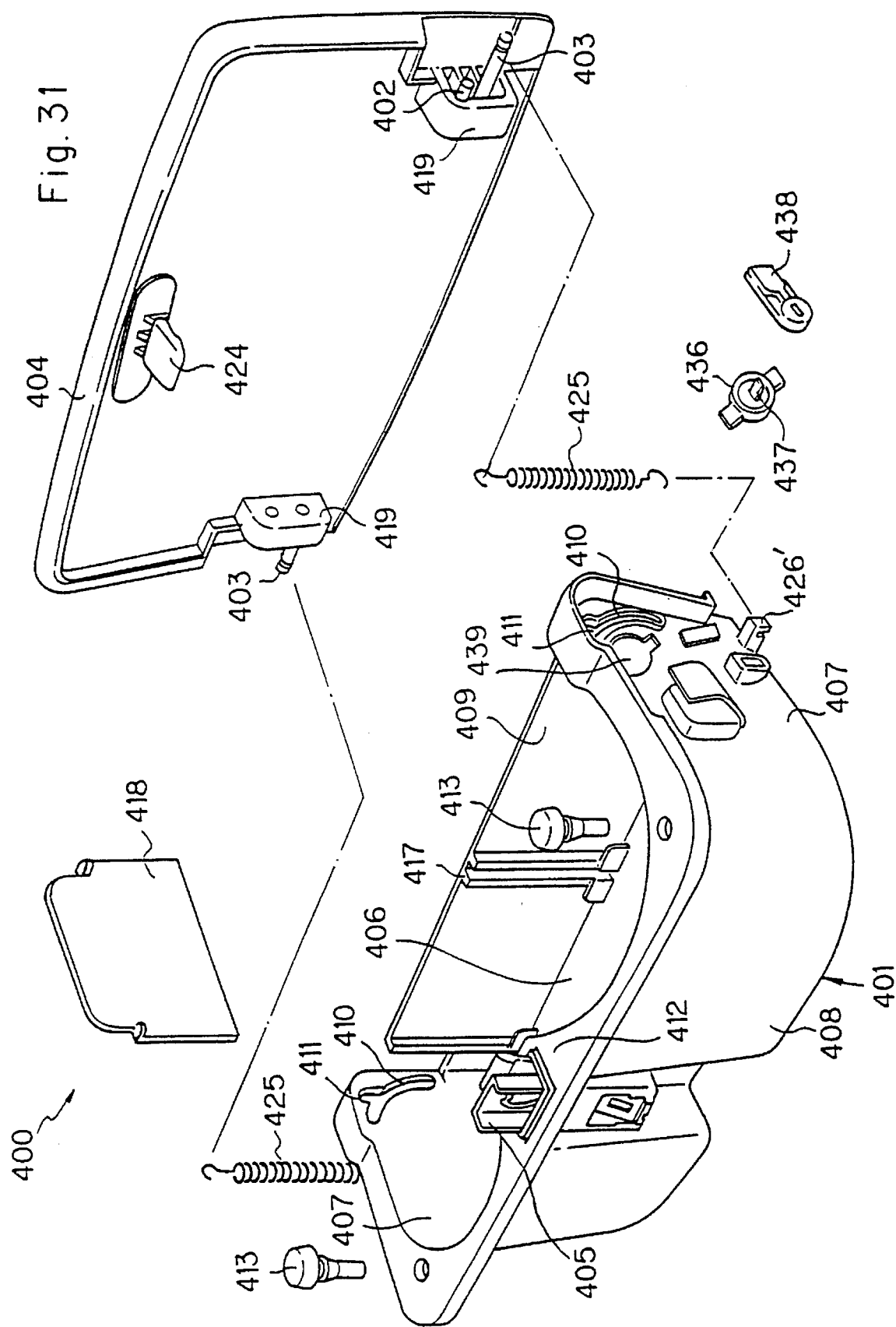
FIG. 31 is an exploded perspective view which illustrates a small article accommodating unit according to another embodiment of the present invention.
Figure 32:
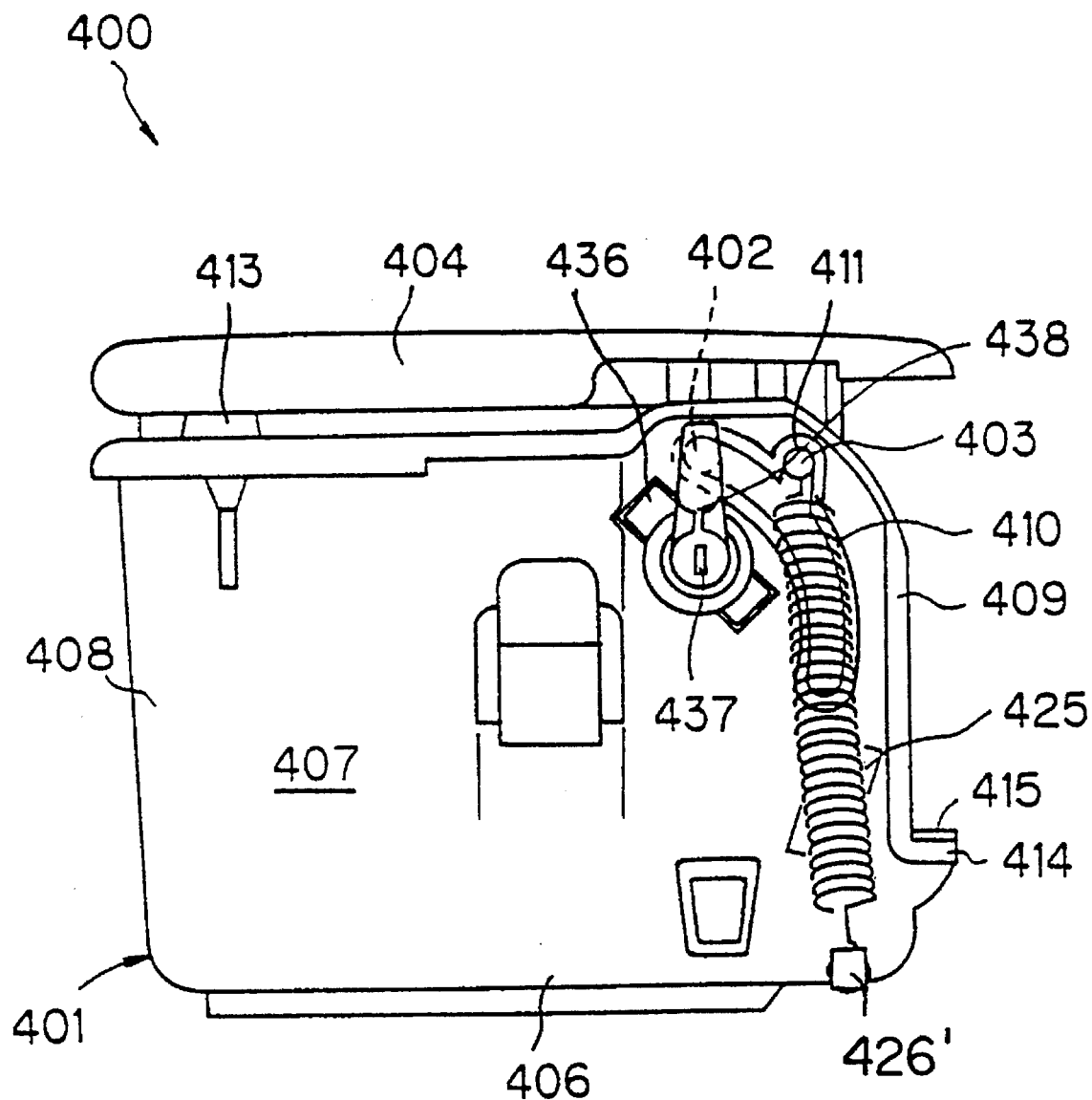
FIG. 32 is a side view which illustrates an small article accommodating unit according to another embodiment of the present invention.
Figure 33:
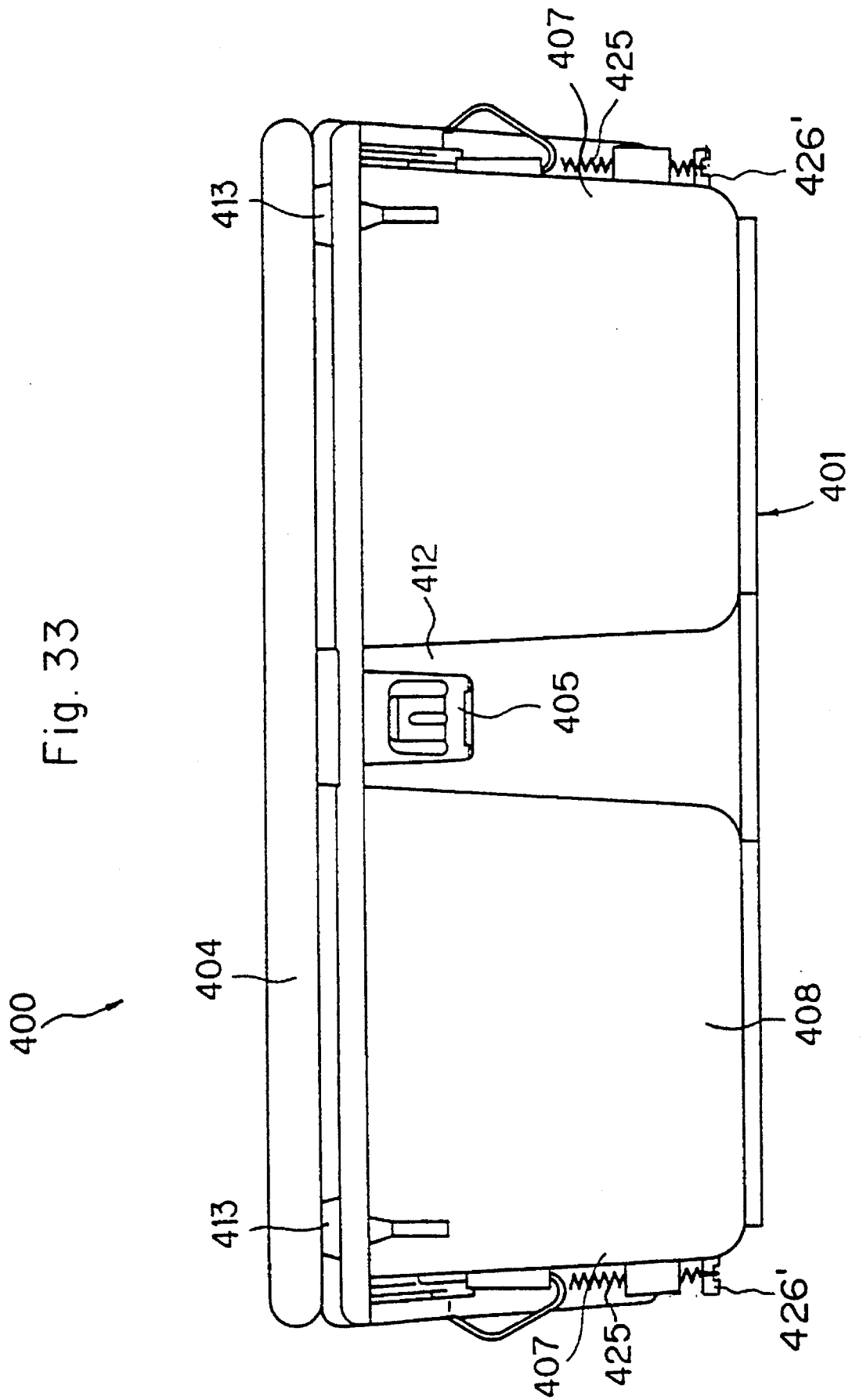
FIG. 33 is a front view which illustrates a small article accommodating unit according to another embodiment of the present invention.
Figure 34:
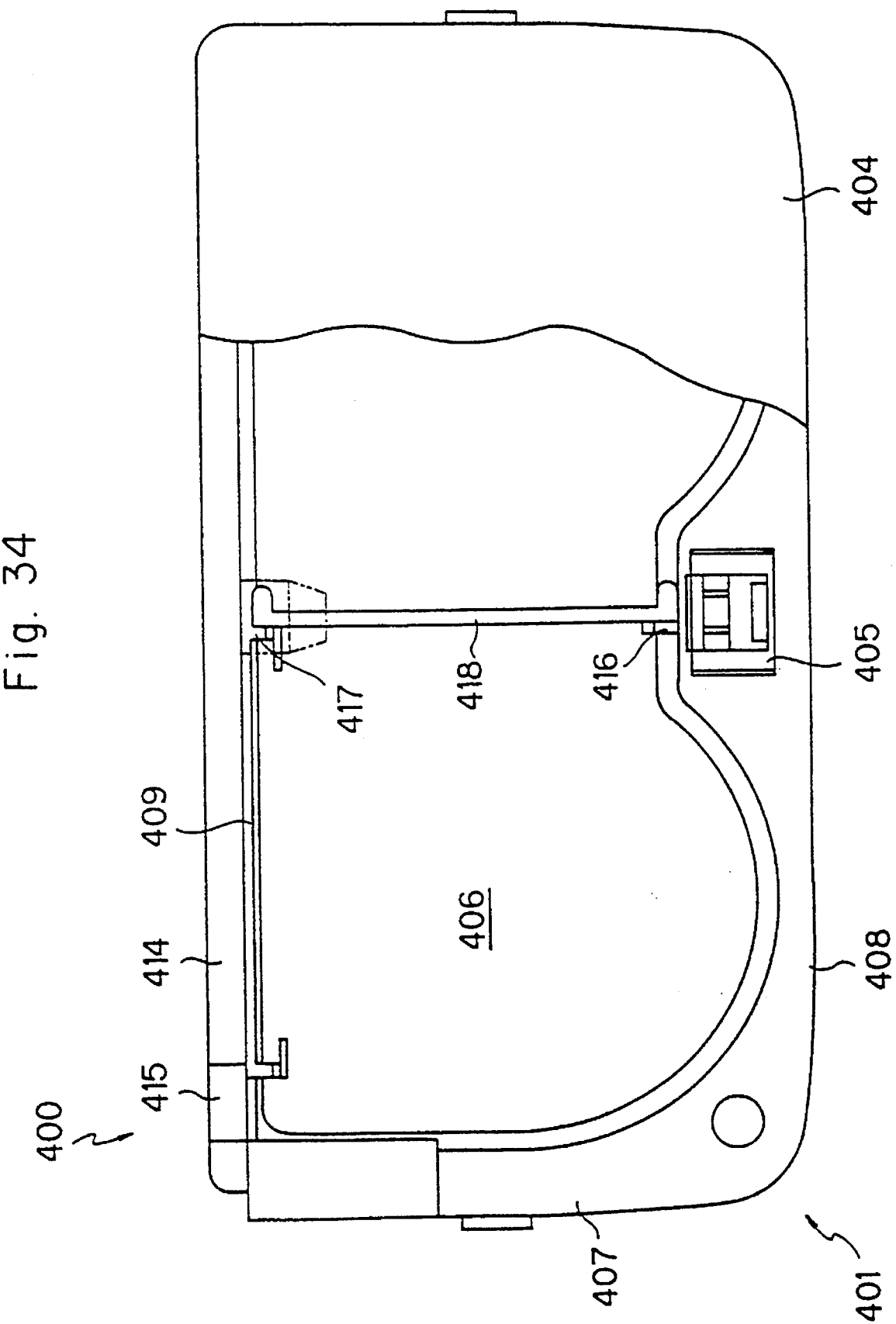
FIG. 34 is a partially-cut plan view which illustrates a cover of the small article accommodating unit according to another embodiment of the present invention.

FIGS. 31 to 34 illustrate another embodiment of the present invention. FIG. 31 is an exploded perspective view which illustrates a small article accommodating unit. FIG. 32 is a side view which illustrates the small article accommodating unit. FIG. 33 is a front view which illustrates the small article accommodating unit. FIG. 34 is a partially-cut plan view which illustrates a cover of the small article accommodating unit.

This embodiment is characterized in that damper units 436 are employed as damping means.

That is, the damper units 436 are used to prevent the cover 404 from rapidly being opened by the tension of the tension springs 427.

The damper units 436 may be rotary dampers using oil. Specifically, silicon oil having high viscous resistance is enclosed in the housing of the damper unit 436. Further, a damper shaft 437 is allowed to pass through the housing to project over the inner and outer surfaces of the housing. Thus, the shearing force generated when the damper shaft 437 is rotated in the silicon oil enclosed in the housing is used to obtain the damper effect.

The damper units 436 are, as shown in FIGS. 31 and 32, secured to the right and left walls 407 of the box 401. Moreover, each damper shaft 437 is connected to the first rotation shaft 402 of the cover 404 through a connection member 438.

The outer surface of each of the right and left walls 407 of the box 401 has a damper-receiving recessed portion 439 having a size into which the housing of the damper unit 436 can be fitted. The damper-receiving recessed portions 439 are formed so that each of the damper shafts 437 of the damper units 436 is located at the center of the circular arc of the guide groove 410 curved in a form of the circular arc in the side wall 407. Further, the housing of the damper unit 436 is placed in the damper-receiving recessed portion 439, followed by securing the housing of the damper unit 436 into the damper-receiving recessed portion 439 by welding, bonding or a screw, or the like, in such a manner that the rotation of the housing is prevented.

The connection member 438, as shown in FIG. 31, extends in the form of an arm from the damper shaft 437 toward the first rotation shaft 402 of the cover 404. An end of the connection member 438 secures the damper shaft 437 in such a manner that the rotation of the damper shaft 437 with respect to the member 438 is prevented, while another end of the member 438 pivotally holds the first rotation shaft 402 of the cover 404.

The spring securing portions 426' according to this embodiment extend from the right and left walls 407 of the box 401 in opposite direction while being formed into rectangular shapes, the spring securing portions 426 being formed integrally with the box 401.

In the description of this embodiment, the same components as those of the foregoing sixth embodiment are given the same reference numerals and their specific descriptions are omitted here.

According to this embodiment, when the cover 404 is opened by the tension of the tension springs 425, the first rotation shafts 402 of the cover 404 are moved downwards along the guide grooves 410 of the box 401. At this time, the connection members 438 pivotally held by the first rotation shafts 402 are turned integrally with the damper shafts 437 around the damper shafts 437. Therefore, the damping force of the damper units 436 acts so that the cover 404 is opened slowly and gently.

Since this embodiment enables the cover 40 to be opened slowly and gently, a high quality small article accommodating unit 400 can be provided that does not deteriorate the silence level and the quality in the vehicle.

Although this embodiment employs the rotary damper using oil as the damper unit 436, the present invention is not limited to this. As an alternative to this, a cylinder type damper unit using a gas or fluid may be employed.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A small article accommodating unit for a vehicle comprising:

a hollow box having an open top;

a cover arranged to open and close said open top thereof;

means for rotatively supporting said cover by said box including a pair of shafts including a rotation shaft attached to one of said box and said cover and a pair of intersecting guide grooves, in which said shafts are seated when said cover is closed and vertically moved while said cover is rotated, formed in the other of said box and said cover;

locking means which locks said cover in a locking state at a closed position and which is capable of suspending said locking state when said cover has been pressed inwards from said closed position;

limiting means for limiting a maximum position of opening of said cover, wherein holding means for holding said cover at its maximum position of opening is formed between said box and said cover.

2. A small article accommodating unit for a vehicle according to claim 1 including, a cup holder movably held in said box and operative for holding cup-like containers within said box.

3. A small article accommodating unit for a vehicle according to claim 2, including means on said cover operative to hold said cup holder in said box for lateral movement with respect said cover.

4. A small article accommodating unit for a vehicle according to claim 3, including bearing portions on said cup holder and bearing portions on said box, each having engaging portions that engage one another when said cup holder is opened by a predetermined angular degree.

5. A small article accommodating unit for a vehicle according to any one of claims 2 to 4, further comprising safety means for inhibiting suspension of locking state of said locking means if inertia force has acted thereon, and further wherein a card holder is disposed on the reverse side of said cover.

6. A small article accommodating unit for a vehicle according to claim 2, including means for moving said cup holder in said box to be suitable to accommodate various outer diameters of said cup-like containers.

7. A small article accommodating unit for a vehicle according to claim 6, wherein a card holder is disposed on a reverse side of said cover.

8. A small article accommodating unit for a vehicle according to claim 1, wherein said box is secured to a console box of the vehicle by clips disposed on securing projection portions disposed in said front and rear walls, each of said clips is composed of a front member and a rear member having substantially V-like shape, said rear member has a securing claw formed to face said front member, and said securing projection portion has an insertion groove having an opened lower surface into which said rear member of said clip is inserted.

9. A small article accommodating unit for a vehicle according to claim 1, wherein an offset end portion is formed on a peripheral edge of said open top of said box, said end portion containing a hole, and a cushion member composed of a cylindrical head portion and a leg portion and made of material exhibiting excellent elasticity is inserted and secured in said hole in said end portion so that said cover is elastically brought into contact with said cushion member.

10. A small article accommodating unit for a vehicle according to claim 1, wherein said holding means comprises a tension spring for urging said cover from said closed position toward said maximum position of opening.

11. A small article accommodating unit for a vehicle according to claim 1 further comprising:
   said limiting means comprises a contact portion formed in said guide groove and arranged to contact said rotation shaft at said maximum position to which said cover can be opened.

12. A small article accommodating unit for a vehicle according to claim 1, wherein said holding means comprises a magnet and a magnetic member attracted by said magnet with one thereof being attached to said cover and the other thereof being attached to said box at a position to create attraction between said magnet and said magnetic member at a maximum position at which said cover can be opened.

13. A small article accommodating unit for a vehicle according to claim 1, wherein the side wall of said box has a damper for lowering the speed at which said cover is opened.

14. A small article accommodating unit for a vehicle according to claim 1 wherein said holding means comprises an elastic member which elastically projects toward said guide groove immediately in front of said contact portion of said guide groove and which is retracted from said guide groove when said elastic member is pressed by said rotation shaft.

15. A small article accommodating unit according to claim 1 including:
   urging means imparting an urging force for normally urging said cover in a direction in which said cover is open,
   locking means for locking said cover in a position with respect to the top of said box, said locking means containing means to retain said cover against the urging force of said urging means, and
   means operative to suspend said locking means when said cover is pushed inwardly from said closed position.

16. A small article accommodating unit for a vehicle according to claim 15 further comprising safety means for inhibiting suspension of a locking state of said locking means when an inertia force has acted thereon.

17. A small article accommodating unit for a vehicle according to claim 14, wherein said urging means comprises coil springs, said coil springs are accommodated in caps formed into hollow shapes and disposed on the front and rear walls of said box, each of said caps has opened right and left sides, and two ends of said coil springs project outwards over said opened right and left sides so that movements of said two ends of said coil springs in the direction of the thickness of said box are limited.

18. A small article accommodating unit for a vehicle, comprising:
   a hollow box having an open top;
   a cover for opening and closing said open top of said box;
   a cup holder movably held in said box and operative for holding cup-like containers in a hollow space in said box;
   urging means for urging said cover in a direction in which said cover is opened; and
   locking means for locking said cover in a locking state in a direction in which said cover is closed against an urging force of said urging means, said locking means being capable of suspending said locking state when said cover has been pushed inwards from the closed position, wherein said box is adapted to be secured to a console box of the vehicle by clips disposed on securing projection portions disposed in said front and rear walls, each of said clips is composed of a front member and a rear member having a substantially V-like shape, said rear member has a securing claw formed to face said front member, and said securing projection portion has an insertion groove having an opened lower surface into which said rear member of said clip is inserted.

19. A small article accommodating unit for a vehicle, comprising:
   a hollow box having an open top;
   a cover for opening and closing said open top of said box;
   a cup holder movably held in said box and operative for holding cup-like containers in a hollow space in said box;
   urging means for urging said cover in a direction in which said cover is opened; and
   locking means for locking said cover in a locking state in a direction in which said cover is closed against an urging force of said urging means, said locking means being capable of suspending said locking state when said cover has been pushed inwards from the closed position, wherein an offset end portion is formed on a peripheral edge of said open top of said box, said end portion containing a hole, and a cushion member composed of a cylindrical head portion and a leg portion and made of material exhibiting excellent elasticity is inserted and secured in said hole in said end portion so that said cover is elastically brought into contact with said cushion member.

20. A small article accommodating unit for a vehicle comprising:
   a hollow box having an open top;
   a cover rotatively supported by said box and arranged to open and close said open top of said box;
   locking means which locks said cover in a locking state at a closed position and which is capable of suspending said locking state when said cover has been pressed inwards from said closed position;
   limiting means for limiting a maximum position of opening of said cover;
   holding means for holding said cover at its maximum position of opening formed between said box and said cover;
   a rotation shaft attached to one of said box and said cover; and
   a guide groove, in which said rotation shaft is vertically moved while being rotated, formed in the other of said box and said cover to which said rotation shaft is not attached, wherein said limiting means includes a contact portion located in said guide groove and arranged to be brought into contact with said rotation shaft at said maximum position to which said cover can be opened, and
   said holding means includes an elastic member which elastically projects toward said guide groove positioned immediately in front of said contact portion of said guide groove and which is retracted from said guide groove when said elastic member is pressed by said rotation shaft.

* * * * *